(12) United States Patent
Willson

(10) Patent No.: US 8,688,622 B2
(45) Date of Patent: Apr. 1, 2014

(54) METHODS AND SYSTEMS FOR LOADING DATA INTO A TEMPORAL DATA WAREHOUSE

(75) Inventor: Ian Alexander Willson, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 327 days.

(21) Appl. No.: 13/082,829

(22) Filed: Apr. 8, 2011

(65) Prior Publication Data

US 2012/0150791 A1    Jun. 14, 2012

Related U.S. Application Data

(63) Continuation-in-part of application No. 12/256,133, filed on Oct. 22, 2008, now Pat. No. 8,271,430.

(60) Provisional application No. 61/057,978, filed on Jun. 2, 2008.

(51) Int. Cl.
*G06F 17/30* (2006.01)
*G06F 7/00* (2006.01)

(52) U.S. Cl.
USPC .......................................... 707/600

(58) Field of Classification Search
USPC ......................... 707/600, 667, 776
See application file for complete search history.

(56) References Cited

U.S. PATENT DOCUMENTS

2009/0299987 A1    12/2009    Willson

OTHER PUBLICATIONS

Bhashyam, Ramesh, Temporal EDW, Oct. 26, 2010, pp. 1-55, Teradata Corporation.
International Search Report and Written Opinion for PCT/US2012/027417 dated Jun. 8, 2012, 10 pgs.
Ahmed et al., "Real-Time Temporal Data Warehouse Cubing", Database and Expert Systems Applications, Aug. 30, 2010, pp. 159-167, XP019149063, ISBN: 978-3-642-15250-4, Springer Berlin Heidelberg, Berlin Heidelberg.
Eder et al., "Modeling Transformations between Versions of a Temporal Data Warehouse", Advances in Conceptual Modeling A Challenges and Opportunities; [Lecture Notes in Computer Science], Oct. 20, 2008, pp. 68-77, XP019107597, ISBN: 978-3-540-87990-9, Springer Berlin Heidelberg, Berlin, Heidelberg.

*Primary Examiner* — Sathyanarayan Pannala
(74) *Attorney, Agent, or Firm* — Armstrong Teasdale LLP

(57) ABSTRACT

A system disclosed includes a temporal data warehouse and a platform independent temporal data warehouse load application operable to run on the system. The load application uses timestamp data from incoming data in conjunction with a relational algebra of set operators to identify and sequence net changes between the incoming data and data previously stored within the data warehouse. The load application loads the identified and sequenced net changes into the data warehouse with relatively little intrusion into normal operation of the data warehouse. Optimizations, including but not limited to, distinct partitioning of the workload into parallel streams are selectable via metadata.

18 Claims, 24 Drawing Sheets

METHODS AND SYSTEMS FOR LOADING DATA INTO A TEMPORAL DATA WAREHOUSE

CROSS REFERENCE TO RELATED APPLICATIONS

This application is a continuation-in-part application of U.S. patent application Ser. No. 12/256,133, filed 22 Oct. 2008 now U.S. Pat. No. 8,271,430, and titled "Methods And Systems For Metadata Driven Data Capture For A Temporal Data Warehouse," which claims the benefit of U.S. Provisional Patent Application Ser. No. 61/057,978, filed 2 Jun. 2008, and titled "Methods And Systems For Metadata Driven Data Capture For A Temporal Data Warehouse," both of which are hereby incorporated by reference in their entirety.

BACKGROUND

The field of the disclosure relates generally to a computer data warehouse (CDW), and more specifically, to methods and systems for metadata driven data capture for a temporal normalized data warehouse.

A need to quickly load and time sequence varying volumes of incoming data with a single general purpose design without resorting to sequential methods exists. Sequential methods are generally not efficient means for initialization and for use with higher volume incoming data events. In addition, there is a need to reduce sometimes intensive pre-processing to detect changes within the data and/or to ensure unique valid time periods to enable creation of a load set of candidate rows for every target table, regardless of the interface type. Finally, because of the costs associated with data storage, there is a need to identify data changes of all types and to avoid loading new data rows with no new content beyond a new authoring timestamp (valid time). Such practices may help to reduce storage usage by collapsing consecutive duplicate rows of data within a time period.

Currently, complex custom data load programs typically running on large external application servers are a solution that has been implemented in an attempt to load a temporal data warehouse. Such programs process and apply data serially by primary key, which may result in long run-times and extensive, relatively intrusive updates to the target tables. In some instances, to continuously support users, two sets of target tables are used and swapped when loading is complete. However, in such systems, typically some data already in the database is removed, processed externally on an application server along with incoming data and re-loaded to achieve the data load, which further stresses the network and database. Other known existing solutions also tend to accommodate only anticipated situations rather than all possible situations, breaking, aborting the load, or rejecting data in unanticipated cases (e.g. valid time tie within a primary key).

Other contemplated solutions generally have other shortcomings. For example, a design that is hard-coded to accept particular types of incoming data and exact target schemas is not desirable due to development costs. Further, maintenance costs may be a concern when addressing primary key or attribute changes to the data source, data target, or method of interface. Use of extract, transform, and load (ETL) tools to perform the work outside of a database on a server is one possible solution, but is inefficient and can be affected by the amount of network traffic. Loss of efficiency in contemplated solutions is particularly large when using external or row-at-a-time solutions on the massively parallel processing (MPP) architecture widely used by data warehouses. Also, proprietary database tools require specialized knowledge and are not portable to other platforms (e.g., Oracle PL/SQL). These solutions are inefficient for larger volumes of data, which may render near-real-time, non-intrusive loading impossible and require different coding for initialization or large volumes of data to achieve acceptable performance.

BRIEF DESCRIPTION

In one aspect, a system for use in loading an incoming data set into a temporal data warehouse is provided. The system includes a storage device and a processor unit coupled to the storage device. The storage device includes a temporal data warehouse and an incoming data set. The processor unit is programmed to divide the incoming data set into a plurality of partitions including a first partition and a second partition. Each partition of the plurality of partitions includes a plurality of data records. The processor is also programmed to import the first partition into a pre-load table, import the second partition into the pre-load table, and apply the pre-load table to the temporal data warehouse.

In another aspect, a method for use in loading a plurality of data records into a temporal data warehouse is provided. The method includes dividing, by a computing device, the data records into a plurality of partitions including a first partition and a second partition. The first partition and the second partition are imported into a pre-load table by the computing device. The pre-load table is applied to the temporal data warehouse by the computing device.

In yet another aspect, a computer program product is provided. The computer program product includes a non-transitory computer readable medium having embodied thereon computer-executable instructions for loading a data warehouse with net change data. When executed by at least one processor, the computer-executable instructions cause the processor to divide an incoming data set into a plurality of partitions including a first partition and a second partition. Each partition of the plurality of partitions includes a plurality of data records. The computer-executable instructions also cause the processor to import the first partition into a pre-load table, to import the second partition into the pre-load table, and to apply the pre-load table to the data warehouse.

DETAILED DESCRIPTION

Figure 1:
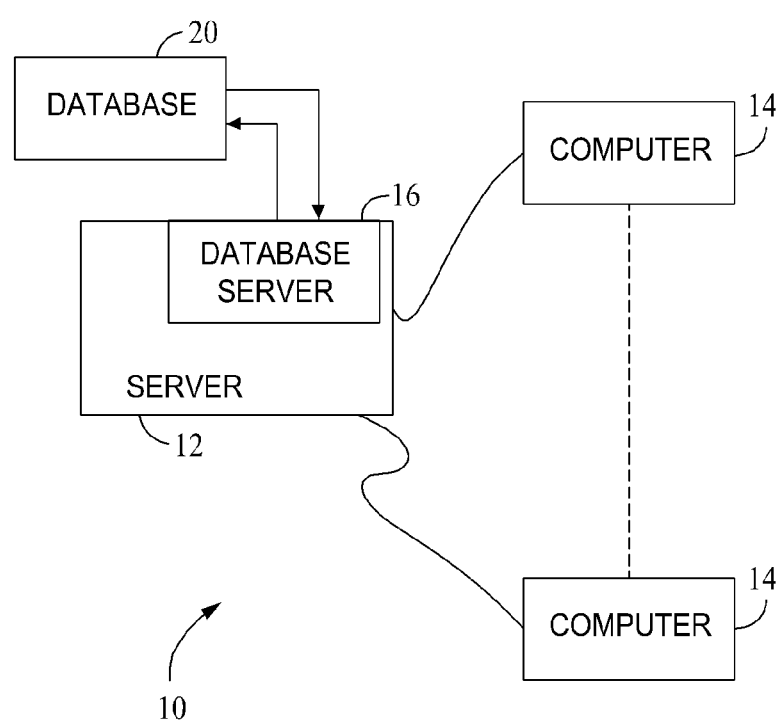
FIG. 1 is a simplified block diagram of a computer system.

Embodiments are described herein with reference to a change data capture (CDC) process. As used herein, the term "CDC" refers to a process of capturing and applying change to a temporal data warehouse. The input to the CDC process, an incoming data set, may already be transformed to match the data model of the target warehouse (e.g., normalized, business or natural key), but without the temporal processing such as time sequencing, temporal normalization and/or resolving temporal collisions. The incoming data set may already be loaded to the database system, such that it is directly accessible by the CDC process.

The present disclosure may be described in a general context of computer code or machine-useable instructions, including computer-executable instructions such as program modules, being executed by a computer or other machine, such as a personal data assistant or other handheld device. Generally, program modules including routines, programs, objects, components, data structures, and the like, refer to code that perform particular tasks or implement particular abstract data types. The present disclosure may be practiced in a variety of system configurations, including hand-held devices, consumer electronics, general-purpose computers, more specialty computing devices, and the like. The present disclosure may also be practiced in distributed computing environments where tasks are performed by remote-processing devices that are linked through a communications network.

The described systems are operable to analyze a set of incoming data, which may be referred to as an incoming data set, with respect to itself and an existing data warehouse, identify and sequence net change data, as compared to the data already stored within the data warehouse, using the relational algebra set of operators, and apply updates to the data warehouse. The incoming data set includes a plurality of data records that may represent a snapshot of a source database (e.g., all data records in the source database at a point in time) and/or a plurality of messages or transactions (e.g., inserts, updates, and/or deletes) that have been executed against the source database.

To accomplish such a method, software code, such as Structured Query Language (SQL) code, corresponding to the data warehouse may be generated when the software described herein is built (e.g., compiled), when the software is deployed, and/or when metadata (e.g., database structures) are revised. The generated code may then be executed by the system each time data is loaded into the data warehouse. In some embodiments, the generated code is created by one or more stored procedures (e.g., functional code stored in and executed by a database), which store the generated code in a database. During a data load, the generated statements are retrieved and executed against incoming data.

The performance, such as execution time and/or computing resource utilization, of the process of loading the incoming data into the data warehouse may be improved using one or more optimization options. Computing resource utilization may include, without limitation, processor utilization, memory utilization, and/or network utilization. Optimization options include, for example, partitioning the incoming data and separately processing each partition, importing incoming data into volatile tables before applying the data to target tables, filtering history from target table comparisons when not needed for the incoming data and a method to temporally normalize the data.

The embodiments described herein are related to a generic metadata-driven temporal data warehouse load design that includes SQL code generators that produce data load code. When executed, the data load code can efficiently process and load into a normalized temporal data warehouse any volume (initial load, migration, daily, hourly) and any type of source system data (push or pull, new or old data), identifying and sequencing net change information into a temporal design based on having a valid start timestamp in the primary key of every table and populating a corresponding valid end timestamp or equivalent time period using only set-SQL statements to create the equivalent of a valid time period. Such processes are sometimes collectively referred to as change data capture (CDC).

The disclosed temporal data warehouse load design operates by analyzing a set of incoming data both with respect to itself and with respect to the existing data warehouse to determine a net change. Appropriate valid time sequencing (temporal design) is then assigned and efficiently applied to new sequenced rows and updates to end timestamps defining the time period in the target data warehouse using only ANSI SQL. This process pre-generates SQL statements (e.g., inserts and temporal updates) and, when loading data, retrieves and executes the SQL entirely within the data warehouse database.

Exemplary technical effects of the embodiments described herein may include, without limitation, (a) dividing an incoming data set into a plurality of partitions including a first partition and a second partition, wherein each partition of the plurality of partitions includes a plurality of data records; (b) dividing the incoming data set based on a hash function and a predetermined quantity of partitions; (c) importing the first partition and second partition into a pre-load table, either sequentially or in parallel (e.g., concurrently); (d) applying the pre-load table to the temporal data warehouse; (e) importing partitions into corresponding volatile tables; (f) copying the partitions from the volatile table to the pre-load table; (g) identifying data records in the first partition that include a plurality of fields other than a timestamp that are equal to non-key fields of a previously imported data record; (h) excluding the identified records when importing the first partition into the pre-load table; (i) executing an implicit delete of the active data record based on detecting that an active data record in the temporal data warehouse is not associated with a data record in the incoming data set; (j) determining an earliest source timestamp associated with a first data record in the incoming data set (k) identifying a set of primary keys representing a data record in the temporal data warehouse associated with a source timestamp immediately prior to the earliest source timestamp, and one or more data records in the temporal data warehouse that are associated with a source timestamp later than the earliest source timestamp; and (l) importing the first partition and the second partition based on the identified set of primary keys.

Embodiments may be described below with reference to particular applications, such as a data warehouse that stores information about bills of material (BOMs) and/or information about parts (e.g., mechanical equipment parts). It is contemplated that such embodiments are applicable to any temporal data warehouse.

FIG. 1 is a simplified block diagram of an exemplary system 10 including a server system 12, and a plurality of client sub-systems, also referred to as client systems 14, connected to server system 12. Computerized modeling and grouping tools, as described below in more detail, are stored in server system 12, and can be accessed by a requester at any one of client systems 14 (e.g., computers). As illustrated in FIG. 1, client systems are computers 14 including a web browser, such that server system 12 is accessible to client systems 14 using the Internet. Client systems 14 are interconnected to the Internet through many interfaces including a network, such as a local area network (LAN) or a wide area network (WAN), dial-in-connections, cable modems, and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

Figure 2:
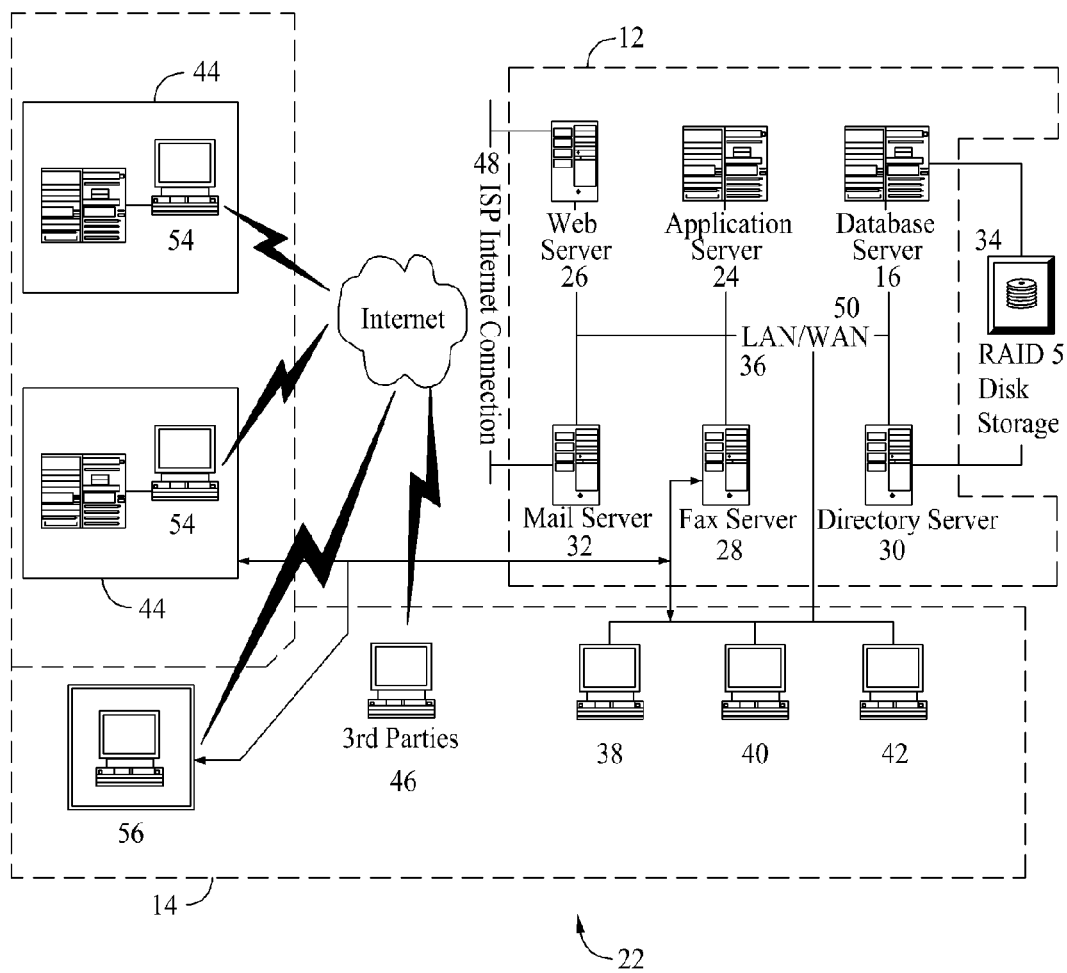
FIG. 2 is a block diagram of a computer network.

FIG. 2 is an expanded block diagram of an exemplary embodiment of a system 22. System 22 is but one example of a suitable computing environment and is not intended to suggest any limitation as to the scope of use or functionality of the present disclosure. Neither should the system 22 be interpreted as having any dependency or requirement relating to any one or combination of components illustrated herein. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 (which includes database 20) is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 using an Internet link or are connected through an Intranet. In some embodiments, database server 16 is coupled to disk storage unit 34, which is inaccessible to other devices, such as directory server 30.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and to third parties, e.g., customers/contractors 46 using an internet service provider (ISP) Internet connection 48. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 50, local area network 36 could be used in place of WAN 50.

In the exemplary embodiment, any authorized individual having a workstation 54 can access system 22. At least one of the client systems includes a manager workstation 56 located at a remote location. Workstations 54 and 56 are personal computers having a web browser. Also, workstations 54 and 56 are configured to communicate with server system 12. Furthermore, fax server 28 communicates with remotely located client systems, including a workstation 56 using a telephone link. Fax server 28 is configured to communicate with other client systems and/or workstations 38, 40, and 42 as well.

Utilizing the systems of FIGS. 1 and 2, highly efficient and relatively non-intrusive near real-time loads are enabled via scheduled mini-batch runs without interrupting user queries. The process is based on standard ANSI SQL, therefore it is applicable to any database platform, leveraging database management system (DBMS) power, providing super-linear scalability, particularly on massively parallel processing (MPP) architectures, and requires no data processing on external servers (e.g., the SQL can be invoked from anywhere). In one embodiment, the data warehouse loading is completely metadata-driven at run-time through the use of primary key definitions and table names as parameters. Another advantage is that schema changes do not require a re-compile or re-start of the change data capture system, and operational metadata may be changed at any time (e.g., explicit or implicit delete form, quantity of partitions, and/or level of parallelism). Otherwise, any interface type can be accommodated, and all tables within the data model (a valid time is included in every primary key) can be accommodated, with a single program. Only candidate rows are required as input (columns+valid timestamp), no identification of what, if anything, has changed is needed as an input to the change data capture system. For snapshot interfaces, no identification of deletion is needed. Ties in valid times may be broken within a primary key with extremely short sequencing times within and across data sets and multiple invocations. Backdated and/or historical updates are performed by updating the time sequencing of both incoming and existing data.

The above mentioned improvements are realized over existing solutions because the existing solutions are oftentimes customized to the interface type and typically are entirely hard-coded for each column in each table. In addition, existing approaches to temporal sequencing are single row-at-a-time, and not en-masse via set-SQL (e.g., using relational algebra of set operators). Therefore these solutions do not scale super-linearly as the change data capture system does. For example, embodiments described herein may process 1,000 rows in less than ten times the time required to process 100 rows. In exemplary embodiments, no data is removed from the database during processing, and the invocation form of the change data capture system can be external (e.g., Perl) or an internal database procedure.

The described embodiments facilitate reducing and potentially eliminating development costs associated with identifying changes (e.g., insert, update, delete, re-statement, and/or historical update) and, applying changes to a temporal data warehouse that retains history via the time period defined by begin-end valid timestamps. An efficient and very scalable design is described, leveraging the DBMS engine and architecture with set-SQL, unlike existing solutions which use inefficient cursors (row-at-a-time), external data load servers and generate associated network traffic. The minimally intrusive design allows continuous queries while loading via a very quick set-SQL apply transaction maximized for efficiency (same structure of final stage and target to minimize workload and maximize throughput within the DBMS) using a variety of query methodologies including, but not limited to, end user locking methods and the use of temporal history via SQL modifiers.

As further described herein, embodiments may be implemented at least in part as a sequence of SQL generators that produce and store SQL statements for loading data by querying against the database catalog (e.g., for column name and basic data type information) and the primary key metadata table. The pre-generated SQL may be executed at run-time against incoming data. The below described sequence of steps analyzes, prepares and then applies candidate rows into a target database in a single efficient transaction. These steps can be implemented in any programming, scripting or procedure language with access to execute the SQL generator against the database, fetch the resulting SQL statement, and then execute that fetched statement against the database.

The following includes definitions for certain terms and abbreviations utilized herein. An online transaction processing (OLTP) database is a transaction-based database that typically includes normalized database structures. For example, a data record (e.g., a row in a table) in an OLTP may include a reference to another data record (e.g., a row in another table), as opposed to a copy of the data in that referenced data record. Further, the OLTP database may enforce referential integrity to ensure that such references are valid (e.g., refer to an extant data record and/or a data record of a particular type).

A primary key (PK) is a full primary key as defined in a data modeling tool for a target table (e.g., a core table, a noncore table, or a derived layer). As used herein, a "noncore" table is a normalized temporal target table, represented herein as a target database layer. A PK includes a source system starting time stamp column called SOURCE_START_TS (available in the database view CDW_PK_COLS_V), which supports the retention of history. The source timestamp represents the start of a period of validity of the row in the authoring system which created it and may be referred to as a creation or last modification timestamp in many systems. The valid time period in a temporal data warehouse may be expressed as a pair of timestamps (e.g., a start timestamp and an end timestamp) representing a time period, in this case inclusive of SOURCE_START_TS and exclusive of SOURCE_END_TS.

PK_Latest is the primary key excluding SOURCE_START_TS, which is typically the Online Transaction Processing System's business key (available in the database view CDW_PK_COLS_LATEST_V).

The W_table is the target of incoming data set transformation. In exemplary embodiments, the W_table includes a copy of the noncore table with the 2 pairs of standard begin-end timestamps representing both temporal periods omitted, but with the source system timestamp present and named SRC_START_TS. When the option ALL_VT (described in more detail below) is set to Y, a volatile copy of the W_table may be used.

The X_table is the pre-load table, the source of all rows that are loaded into the target table. The X_table may be a copy of the target table with the addition of a column to store the assign action (ETL Indicator) and the two source timestamps named as src instead of source.

A target is a one-layer computer data warehouse corresponding to a single database with uniquely named tables that represent the scope of the data warehouse. Noncore is an example of a target. Other potential database table layers are core (e.g., fully integrated in third normal form, or 3NF) and derived (e.g., pre-joined, aggregated). All processes can apply to these three layers unless otherwise stated, with derived data sourced potentially from a noncore or core table but still presented as input into a W_table prior to invoking the process. When the option ALL_VT (described in more detail below) is set to Y, a volatile copy of the target may be used.

The ALL_VT option indicates whether the system should use volatile working tables. When ALL_VT is disabled (e.g., set to N), the system uses two generated working tables (e.g., the W_table and the X_table) in the stage database that are based on their target counterparts. A third volatile or non-persistent table may be utilized prior to execution of the process described herein to load the W_table. For each target table, there may be up to three script-generated variants of these tables built into the staging area database, in addition to any other tables used externally to transform incoming data sets for use by the CDC process. Volatile table copies of these are created when ALL_VT is enabled (e.g., set to Y). These three tables are additional tables that may not be directly modeled by a database modeling tool. Rather, they may be built by a script at build time and included in the target build scripts, except for volatile tables which are built at run time.

In exemplary embodiments, a script creates and names each table as shown in Table 1.

TABLE 1

| CDC Common Table Structure | Table Definition |
| --- | --- |
| W_ table: Target table for all stage transformation for except explicit deletes, right side of the target mapping. | Target noncore/derived table definition from modeling tool - except drop SOURCE_END_TS, CDW_START_TS, CDW_END_TS, rename SOURCE_START_TS as SRC_START_TS + make optional |
| X_ table: Direct source of all target data and is loaded from either W_ table or potentially external processes. Apply phase of CDC runs only from here, adds or uses ETL indicator codes are I, O, U, | Target noncore/derived table definition from modeling tool - except drop CDW_START_TS, CDW_END_TS, rename SOURCE_START_TS as SRC_START_TS + make optional, |

TABLE 1-continued

| CDC Common Table Structure | Table Definition |
|---|---|
| D. The CDC code moves the incoming data from W_ to X_, except for explicit/cascaded deletes (done prior to CDC invocation). | rename SOURCE_END_TS as SRC_END_TS, add column ETL_INDICATOR CHAR(1) to end of table. |
| CDW_PK_COLS_LATEST_V (view only) | Loaded from modeling tool primary keys, query on DATA_LAYER, normally only use target, derived in ETL processing |
| CDW_PK_COLS_V (view on base table) | Loaded from modeling tool primary keys, query on DATA_LAYER, normally only use target, derived in ETL processing |

The W_table is the target table for all stage transformation prior to invoking the CDC system, except for explicit deletions. The X_table is the direct source of all target data and is loaded from either the W_table or via potentially external processes in the case of explicit or cascade deletes. An apply phase of the CDC system adds or uses ETL indicator codes in the X_table such as I, O, U, and D which are defined elsewhere herein. The codes associated with the CDC system are initialized or set when moving the data from the W_table to the X_table and further updated within the X_table prior to controlling the final application of change to the target database.

In exemplary embodiments, when ALL_VT is enabled, the script creates and accesses tables as shown in Table 2, where TNAME corresponds to the actual target table name.

TABLE 2

| Table | Populated in Step | Used in Step(s) | Contents |
|---|---|---|---|
| TNAME_VT | 105 | 106-111 | Copy of target table limited to PK's in X and 1 prior row of history |
| TNAME_TVT | 100 | 102-105 (if ALL_VT = Y) | VT of target table (partition optional) |
| TNAME_WVT | 101 | 103-104 (if ALL_VT = Y) | VT of W table (partition optional) |
| TNAME_XVT | 101 | 102, 104-112 (if ALL_VT = Y) | VT of X table (partition optional), ins sel to X table in Step 112 |
| TNAME_KVT | 103 | 104 (if NORMALIZE_LATEST = Y) | VT of X table PK's (partition optional) to exclude in Step 104 comparison (no new info) |

Extract, transform, and load (ETL) operations may be referred to using the ETL indicators shown in Table 3.

TABLE 3

| ETL Indicator | Target action(s) | New target row end TS |
|---|---|---|
| I | Insert new row | Null (open valid time) |
| U | Insert new row, update target latest row ending timestamp (if not already expired) to earliest U row start ts within PK in X_table. Any end timestamp only comes from other X_table records. | 1. Null if the latest row within PK in X_table OR 2. Start of the next X_table row (even if a delete) (closed valid time) |
| O | Insert a new row that is an out of sequence update, in that it is not the latest start ts within the PK_Latest OR it is the latest row but its start ts is older than the latest expiry within the PK. In | 1. Set end ts in X_table to be start ts of next row within PK in target OR 2. Set end ts after loading into target to be latest expiry date (closed valid time) |

TABLE 3-continued

| ETL Indicator | Target action(s) | New target row end TS |
|---|---|---|
|  | either case the row will get an end ts (pre-expired), either in the X_table or after loading into target. |  |
| D | Update latest current target table row with unexpired ending timestamp or prior X_table (if immediately prior), set end ts only from start ts of X table row. Row does not directly load | Null, unless updated within batch with a newer row in the X_table (closed valid time) |

As shown above, extract, transform, and load (ETL) indicators include I, U, O, and D, and each is associated with one or more target noncore table actions, such as loading a new target row or ending a time stamp on an existing row. For ETL indicator I, the noncore action is insertion of a new row, and the new target row ending time stamps are NULL (latest row, no end of period validity) until superseded or logically deleted. For ETL indicator U, the noncore actions are insertion of a new row, an update to the noncore latest row ending timestamp (if not already expired) to the earliest U row start timestamp that is within the primary key (PK) in the X_table. Any end timestamp comes from other X_table records. The new target row ending time stamp for indicator U is NULL if the latest row is within the PK in the X_table, or the start of the next X_table row. Unless a time period gap is explicitly set via a logical delete or otherwise specified in advance, the end timestamp or end period a row is implied by the starting timestamp of the subsequent row within the primary key. Thus the default ending timestamp or period of validity of new rows is "until superseded."

For ETL indicator O, the noncore actions are insertion of a new row that is an out of sequence update, in that it is not the latest start timestamp within the latest primary key (PK_Latest), or it is the latest row but its start timestamp is older than the latest expiry within the primary key. In either case, the row is associated with an end timestamp (i.e., is pre-expired), either in the X_table or after loading into noncore. For indicator D (logical delete), the noncore actions are an update of the latest current target table row with an unexpired ending timestamp or prior X_table (if immediately prior), a setting of the end timestamp from that starting timestamp of the X_table row. The row does not directly load. The new target row ending time stamp for indicator D is initially NULL and may later be updated based on a newer row in the X_table.

In exemplary embodiments, ETL CDC processing and code generators rely on the primary key metadata pre-populated into a stage table. Two views are created to provide either the complete data warehouse primary key, including SOURCE_START_TS, or the latest view of this key, typically an OLTP business key, excluding SOURCE_START_TS. Additionally, code generators rely on standard database catalog views, which provide information describing database structures (e.g., databases, tables, and/or columns). The first view, which may be implemented as a view only, may be named CDW_PK_COLS_LATEST_V. The second view, which may be a view on a base table, may be named CDW_PK_COLS_V. Both the first view and the second view are loaded from primary keys in a modeling tool, query on DATA_LAYER, and normally use noncore, derived layers in ETL processing.

The change data capture process operates based on the defined standardized schema process to build work tables, namely the generic form of the W_tables and X_tables and the availability of the primary key metadata via 2 views noted earlier.

With regard to a functional summary of the change data capture process, a source-system specific transformation process per noncore, derived and any other associated data load, through transformation and loading of the source data into the W_table (in the stage database) from the staging tables is performed prior to invoking change data capture, with the exception of explicit delete messages. The process of loading W_tables is typically independent for each table, but may not be fully independent based on the specific transformation process defined for the database.

In one embodiment, W_tables and X_tables are emptied prior to the beginning of each CDC run for a source system. Change data capture loads data from the W_table into the computer data warehouse (CDW) data layer (e.g. noncore) via the X_table, except for explicit deletes. In exemplary embodiments, this process is parallelized to the extent possible across target tables and has no inter-dependencies.

In exemplary embodiments, the CDC system applies phase loads to each target table in a single database transaction using set-SQL in a relatively short amount of time (typically a few seconds or less). These transactions are parallelized across tables to the extent possible and have no inter-dependencies. The change data capture system and methods described herein relate to a mini-batch design that allows flexible rapid loading of CDW without disrupting reporting, based on suitable query access methods which may leverage temporal criteria. No database utilities are used to load the target tables. For a given source system or set of related tables, the entire batch run may be completed before initiating a new batch run. In other words, the CDC-related portion of the data load is performed without parallelizing or overlapping with respect to a target table.

The CDC system updates only the two standard ending timestamps (source or valid and transactional or ETL) of existing target rows, with the source ending timestamp (source_end_ts) typically being set only to the source system specified deletion timestamp (for deletes) or the source start timestamp of the subsequent row, except for gaps created by logical deletes. This effectively updates the valid time period which without loss of generality may be implemented using a period type if available instead of a pair of time stamps. All new data (e.g., any new key or non-key attribute value) results in a new target row. No other CDW columns may be updated in target tables by the CDC process, except that specified derived tables may be entirely refreshed in some cases.

The CDC system ensures the uniqueness of the primary key per computer data warehouse metadata loaded directly from the data model. No active integrity constraints are assumed or required to be implemented. Accordingly, a passive checking script may be run as a further validation. The CDC system also ensures that timestamp ranges are valid. For example, the system may verify that the ending source or valid timestamp is greater or equal to the starting timestamp, and/or within a PK, that the source starting timestamp is equal to the source ending timestamp of the prior row except for deletions, and/or that the source ending timestamp is null for the latest row within a primary key unless logically deleted. Similar functionality may be envisioned operating on a time period data type instead of a pair of timestamps.

The CDC system populates all four standardized timestamps representing both temporal time periods, with the source starting timestamp being the only timestamp always populated from the source data row (named SRC_START_TS in W_tables and X_tables). The source ending timestamp attribute is also obtained from the source by way of the start timestamp of the next row within the primary key with unique content or the deletion time of the current row (if known, otherwise the current time), but can be null when a row represents the latest information.

The two CDW timestamps reflect the actual load time (transaction time) but may be standardized for a given mini-batch run for a given table. For example, the CDW timestamps may be obtained immediately prior to the load and set as a fixed value to allow easy identification of all rows loaded in a given mini-batch run for a given table. The CDC system also collects or refreshes statistics after each table is loaded (W_table in pre-CDC, X_table as part of Step 104 if ALL_VT is disabled, or at the end of the last iteration of Step 112). The change data capture system also can invoke passive primary key uniqueness and foreign key integrity checking, if not separately invoked, per functional requirements.

In the CDC system, an implied parent-to-child delete may be implemented as a place-holder to show the process flow to be accommodated. Variations needed by complex stage transformation and mixed model publication (e.g., push and snapshot for one table) are not addressed. As noted, any explicit and any complex implicit deletes may be loaded into the X_table prior to the start of CDC by source system specific transformation code. The CDC system allows a deleted record to be restored or "re-born," even in the same batch. Such a condition may be detected when noting that the source's starting timestamp is greater than or equal to the prior record's source ending time stamp, which is only indicative of a delete.

In exemplary embodiments, noncore new row count is equal to noncore old row count+I+O+U counts. The system may count updates (O and U may be tracked separately) and validate these counts against counts of O and U in X_table where the ending timestamp is not null.

Pre-generated queries produced by code generators may include a condition related to the data layer to prevent potential duplicate table names in different layers (e.g., noncore, core, and derived). In exemplary embodiments, timestamp columns that are not the specified CDW and SOURCE timestamps include a time zone and six digits of precision. One or both of these requirements may be omitted with appropriate changes to the code generators.

Exemplary methods for loading incoming data into a data warehouse are described below with reference to particular processing steps or operations. Separate modules are provided based on applicable pre-requisites, with invocation being once per target W_table or X_table, with the option of running multiple partitions in parallel in multiple iterations within the partition load steps (shown in FIG. 4) per metadata settings. For example, Steps 100 through 112 described herein may require that all W_tables that are related to a source system be fully loaded prior to the initiation of processing, in the event that there are inter-dependencies amongst the incoming data. The CDC process itself, however, introduces no such inter-dependencies.

In exemplary embodiments, each step is executed as a separate SQL statement, enabling an avoidance of database performance penalties. Further, Steps 100 to 112 may not be included in a single database transaction. Rather, for example, each step or each of multiple groupings of the steps may be executed in a separate transaction. In some embodiments, the entire load process is aborted in the event of any database error but may continue in the event of an information message and/or a warning message. Apply Steps 201-207 may be run as a single database transaction of multiple single requests, with an explicit rollback issued on any error. All CDC processes may be completed before a new minibatch run is initiated for a given source system.

The database names for stage and the target databases may be parameterized appropriately for each CDW environment. Table names are parameterized based on the target table name and assigned to the correct database name (W_, X_, and X_tables are in the stage database, and the target table can be in the noncore, core, or derived database). Note that some example tables are not qualified as to the database. For example, W_ and X_ may be in STAGE, whereas target typically is NONCORE.

Appropriate locking modifiers are added by the CDC code generator to minimize lock contention on target tables or shared persistent stage. In exemplary embodiments, ETL does not control access to the target data during the transaction that encapsulates the apply phase. The common data warehousing architecture includes a 'dirty read' equivalent to 'LOCK FOR ACCESS' for outbound database views. The order of the apply steps described above within the transaction is set to minimize this issue. In alternative embodiments, additional SQL views are defined that wait for the transaction to be completed if needed.

In exemplary embodiments, the CDC process is controlled at the target table level, with synchronization points controlled at the source system level, corresponding to jobs documented and structured according to ETL code. The apply steps (one database transaction per table) for all tables in a source system may be parallelized to the extent possible to provide a consistent view of the new data and minimize referential integrity issues in queries. It should be noted that true referential integrity may not be enforced with conventional constraints due to the source start timestamp being part of the primary key and varying between parent and child in some embodiments. Use of a time period data type, if available, may allow for temporal PK and foreign key (FK) constraints to be enforced.

Figure 3:
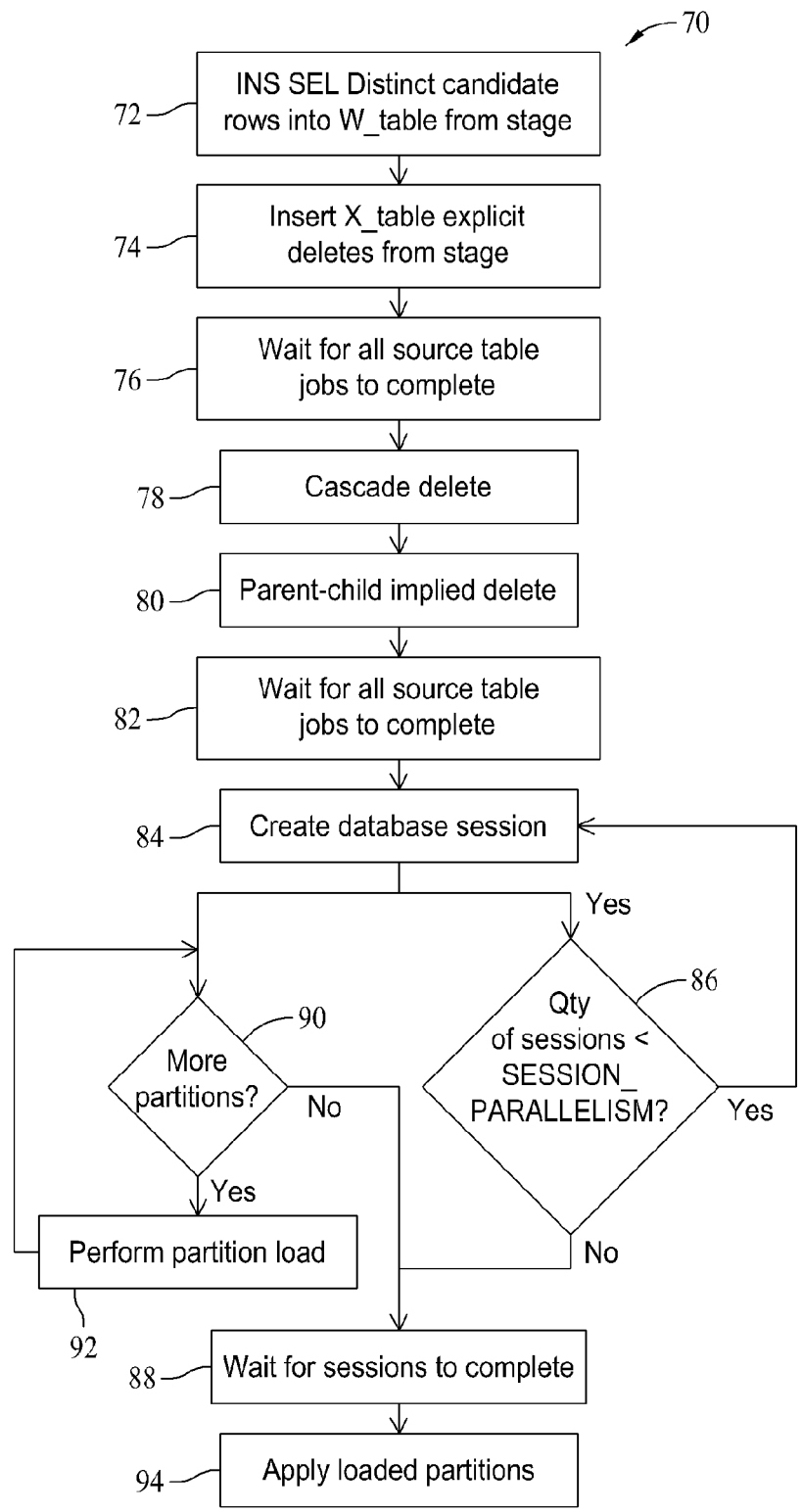
FIG. 3 is a flowchart illustrating an exemplary change data capture process.

Referring to FIG. 3, which is a flowchart 70 illustrating an exemplary change data capture process along with supporting pre-requisite external load processes that may be desired, distinct candidate rows are inserted in step 72 into the W_table by external processes (e.g., processes other than the CDC process). In exemplary embodiments, all qualifying Source system table rows (e.g., messages or snapshots) are written to the W_table using a table-specific transformation. INSERT SELECT set logic may be used. In one alternative of step 72, the candidate rows are inserted into and populate the W_table with a starting point or baseline for CDC code of one "batch" run. Complete duplicate rows are eliminated with the use of DISTINCT in the SELECT statement. After the insert in step 72, the W_table contains a complete distinct snapshot of the transformed incoming data set, which may include history if retained and provided by the source. For a message-based interface, this step may exclude Delete messages.

In step 74, explicit deletes are inserted into the X_table from stage, exclusive of or in combination with Step 101, which is further described below. The stage/transform SQL code loads the PK attributes and a "D" (delete) ETL indicator into the X_table in such cases. In one alternative, the X_table is cleaned (e.g., emptied) prior to inserting in step 74 explicit deletes. In another alternative, step 74 includes insertion of explicit deletes omitted for a snapshot-type interface, which may not include any explicit deletes, except when LOAD_TYPE=B, in which case a combination of both may be allowed. When implicit deletes are used instead of explicit deletes, step 74 may be omitted.

In step 76, the CDC process waits 76 for load jobs associated with the source tables to complete. In optional step 78, when the load jobs are complete, a cascade delete is executed. For some tables (e.g., dependent children), delete rows are written to the X_table. The transform SQL process for source system directly loads the PK, parent src_start_ts, ETL indicator of "D", and the source start timestamp of the row to expire. In one exemplary embodiment, the cascade delete of step 78 is an optional pre-requisite to the CDC process based on the source transform for parent deletes that cascade to children and are not explicitly provided. For target rows that are not the latest, these deletes may be executed in Apply Step 206, described in more detail below.

In optional step 80, a parent-child implied delete is performed. In one alternative, delete rows are written to the X_table for one or more tables (e.g., dependent children) in response to updates. A transform SQL process for the source system loads the PK, parent src_start_ts, ETL indicator of "D", and the source start timestamp of the prior parent row not sent with this child stored in src_end_ts. In another embodiment, the design is varied based on the source system interface (e.g., inherit parent TS). In one alternative of step 80, the parent-child implied delete is an optional pre-requisite to the CDC process based on the source transform for dependent child row updates that imply deletion of all prior children. In one alternative embodiment, for target rows that are not the latest, these deletes are executed in accordance with Apply Step 206, disclosed below. In some embodiments, Steps 72 to 82 are preliminary to the CDC process and are not contained within the processes described herein.

In step 82, the CDC process waits for jobs associated with the source tables to complete. When these jobs are complete, in step 84, a database session is created. Step 84 may include creating the database session in a process and/or a thread that is specific to the database session, such that operations performed in one session do not affect operations performed in another session.

In step 86, the quantity of sessions created is compared to SESSION_PARALLELISM. If the quantity of sessions is less than SESSION_PARALLELISM, step 84 is performed again to create another database session. Otherwise, in step 88, the CDC process waits for all database sessions to complete processing.

For each database session that is created by step 84, the CDC process determines in step 90 whether any partitions are available to load. If so, in step 92, a partition load is performed using an available database session created by 84, as described below with reference to FIG. 4. In one embodiment, step 92 provides for the partition load to perform an import of one partition of the incoming data into a pre-load table, such as the X_table.

In some embodiments, the incoming data is divided into a plurality of partitions (e.g., by setting NUM_PARTITIONS to a value greater than 1), and step 92 may be performed for each partition. For example, the incoming data may be divided distinctly with respect to the PK and substantially evenly (e.g., with 1%, 5%, or 10% variation in partition sizes) using metadata. In one instance, the quantity of partitions may be defined by a user-provided parameter, NUM_PARTITIONS. Setting NUM_PARTITIONS to a value of 1 may effectively disable partitioning of the incoming data set by causing the entire incoming data set to be treated as a single partition.

When NUM_PARTITIONS>1, a plurality of partitions may be loaded in parallel based on another user-defined parameter, SESSION_PARALLELISM, which represents a desired degree of concurrency of execution of individual partitions. Alternatively, the partitions may be loaded sequentially, or in series. For example, setting SESSION_PARALLELISM equal to 1 may result in sequential processing of partitions.

When, at step 90, the CDC process determines that no partitions are available to import in a database session, the session completes processing, and execution continues at step 88, in which the CDC process waits for all database sessions to complete.

Figure 6:
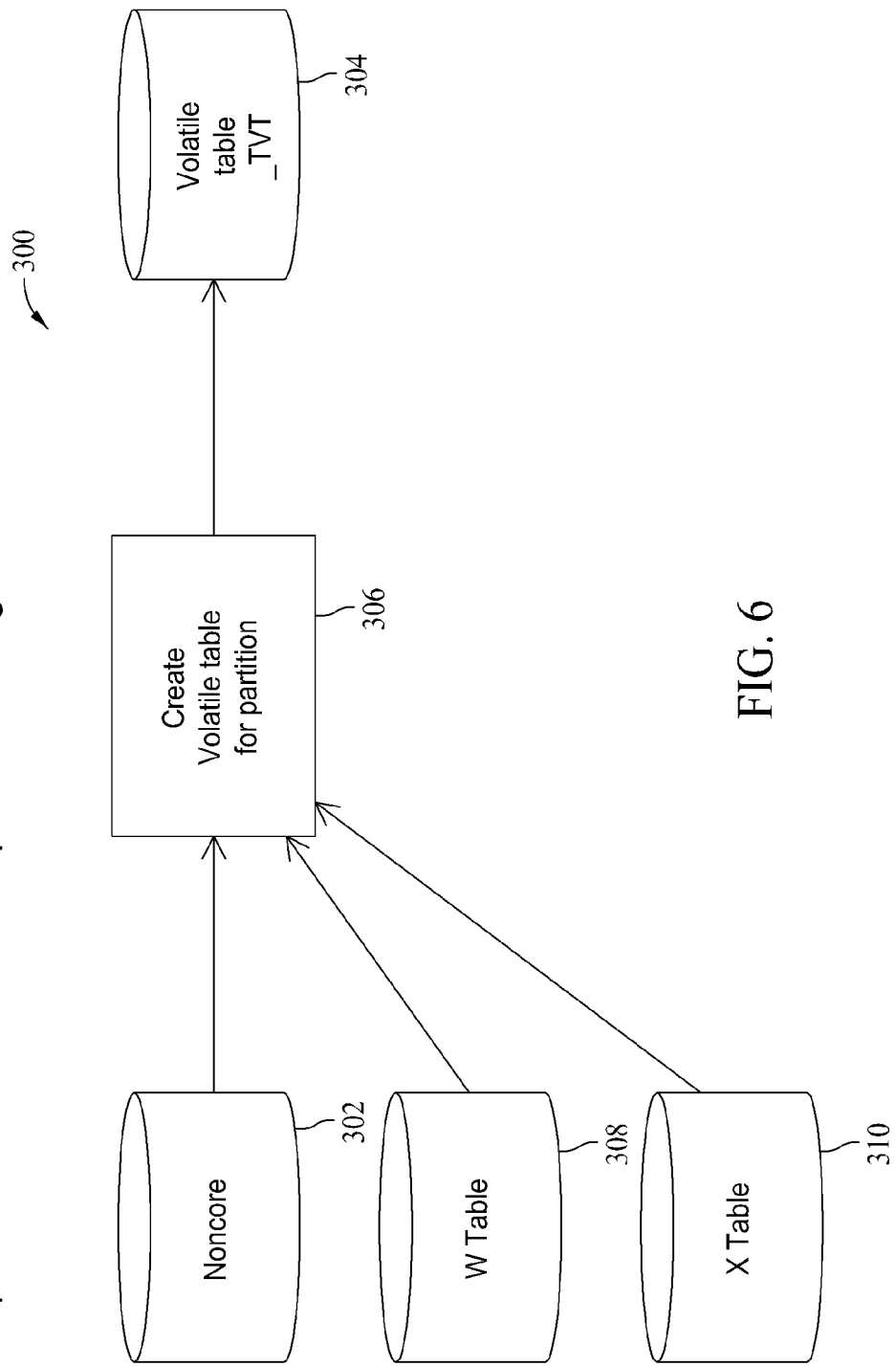
FIG. 6 is a data flow diagram associated with Step 100 shown in FIG. 4.

In step 94, after all partition loads are complete, all of the loaded data is applied in one database session, as described with reference to FIG. 6. In one illustrative example, NUM_PARTITIONS is set to 5, and SESSION_PARALLELISM is set to 3. Step 84 is performed three times to create three database sessions. The first session executes step 92 to perform a load of the first partition, the second session executes step 92 to perform a load of the second partition, and the third session executes step 92 to perform a load of the third partition. Assuming in this example that the partitions are substantially similar in size, the first database session completes step 92 (with respect to the first partition) and performs step 90, determining that more partitions (i.e., the fourth and fifth partitions) are available for loading. The first database session executes step 92 to perform a load of the fourth partition. The second database session completes step 92 (with respect to the second partition) and performs step 90, determining that a partition (i.e., the fifth partition) is available for loading. The second database session executes step 92 to perform a load of the fifth partition. The third database session completes step 92 (with respect to the third partition), performs step 90, determining that no partitions are available to load, and advances to step 88 to wait for all sessions to complete. Similarly, both the first and second database sessions complete step 92 (with respect to the fourth and fifth partitions, respectively), perform step 90, determining that no partitions are available to load, and advance to step 88 to wait for all sessions to complete. With all database sessions complete, the CDC process advances to step 94 to apply the loaded partitions in one database session.

Figure 4:
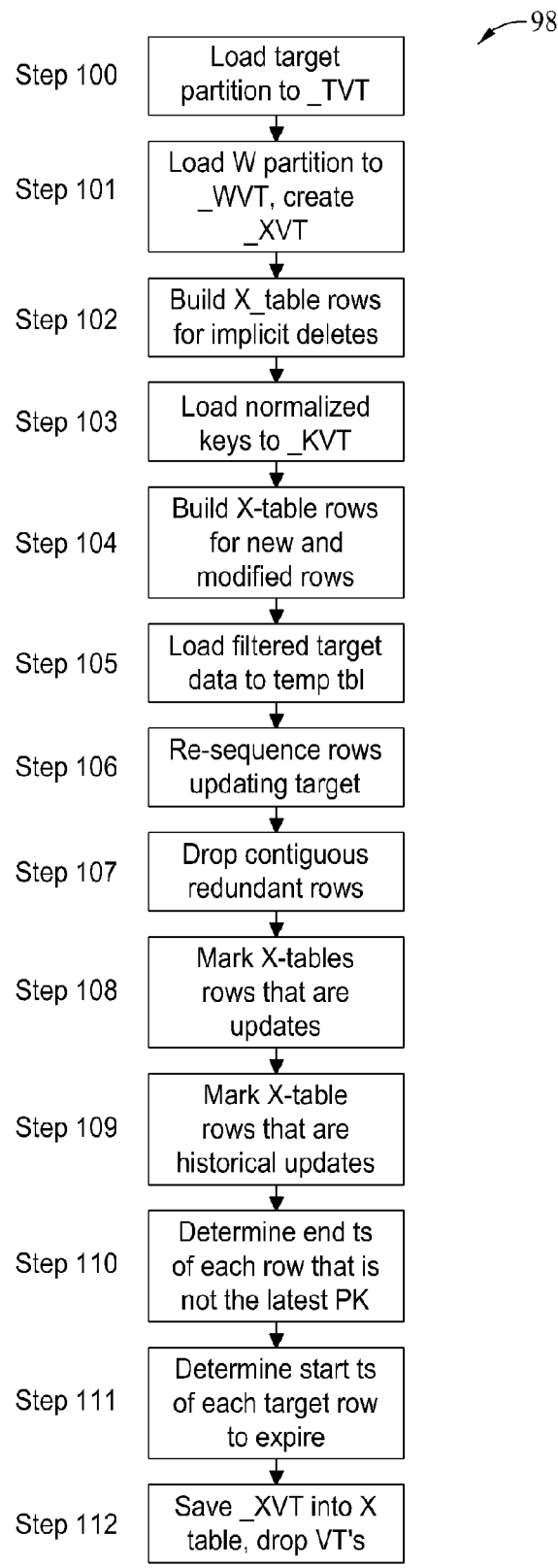
FIG. 4 is a flowchart illustrating an exemplary partition load process.

FIG. 4 is a flowchart 98 illustrating an exemplary partition load process. In exemplary embodiments, the process illustrated by flowchart 98 is performed for each of NUM_PARTITIONS partitions, sequentially and/or in parallel. The steps described below may be dependent on one or more metadata parameters, as shown by Table 4.

TABLE 4

| Step | LOAD_TYPE | ALL_VT | NORMALIZE_LATEST | NUM_PARTITIONS | TVT_FILTER_HISTORY |
|---|---|---|---|---|---|
| 100 | S\|B | Y | n/a | 1-N of N | Y\|N |
| 101 | S\|B | Y | n/a | 1-N of N | n/a |
| 102 | S\|B | Y\|N | n/a | n/a | n/a |
| 103 | S\|B | Y\|N | Y | n/a | n/a |
| 104 | n/a | Y\|N | Y\|N | n/a | n/a |
| 105 | n/a | Y\|N | n/a | n/a | n/a |
| 106 | n/a | Y\|N | n/a | n/a | n/a |
| 107 | n/a | Y\|N | n/a | n/a | n/a |
| 108 | n/a | Y\|N | n/a | n/a | n/a |
| 109 | n/a | Y\|N | n/a | n/a | n/a |
| 110 | n/a | Y\|N | n/a | n/a | n/a |
| 111 | n/a | Y\|N | n/a | n/a | n/a |
| 112 | S\|B | Y | Y\|N | n/a | n/a |

In exemplary embodiments, a character value (e.g., "Y" or "S") in Table 4 indicates that that a step is performed only when the metadata parameter is equal to the character value. A pipe symbol ("|") indicates a disjunctive ("or") relationship between character values, in which case the step is performed when the metadata parameter is equal to any of the listed character values. Further, "n/a" indicates that a metadata parameter is not applicable to a process step. In such cases, the step may be performed regardless of the value of the metadata parameter.

In step 100, a load of a target partition is executed for a snapshot load (e.g., LOAD_TYPE=S or B) when ALL_VT=Y and NUM_PARTITIONS>1. In summary, Step 100 is called for large tables where a cost of creating a distinct logical partition of a table into separate volatile tables reduces processor usage and/or elapsed execution time more than the cost of adding this step. In one embodiment, Step 100 may be invoked under identical conditions with Step 101.

In Steps 100 and 101, a logical partition is created using the HASHBUCKET(HASHROW( )) function, which in an exemplary embodiment creates an integer between one and one million based on the primary key columns excluding the source start timestamp. This provides relatively even partitioning (e.g., partitions of similar sizes) and is a low cost (e.g., in terms of computing resources) method to deterministically assign data row to a distinct partition. The MOD (modulus) function is used against the metadata parameter NUM_PARTITIONS, with 1 to N as the remainder being the metadata value for CURRENT_PARTITION. The code generator instantiates these values in SQL for Steps 100 and 101 and stores them appropriately for retrieval in the CDW_CDC_SQL table based on table parameters in CDW_CDC_PARM.

Step 100

In exemplary embodiments, Step 100 uses a history filtering parameter called TVT_FILTER_HISTORY, with the typical value of N (no). When TVT_FILTER_HISTORY is equal to Y, the CDC system prunes older history rows in the target table not needed during the CDC run based on the incoming data in the W_table. The earliest timestamp for each W_table PK is queried and compared to build a set of target table primary keys, which act as a filter on the partitioned volatile table. A derived table is built using the WITH clause of the older source timestamp per primary key in the W_table applying the partition filter. This is then used to create a distinct set of primary keys needed from the target table that excludes all older history.

In one embodiment, the set includes rows newer than the earliest W_table row, the row before the earliest W_table row, and the latest row, if not already included, to ensure proper implied delete processing in Step 102. In one alternative, the partition expression applies in each case. In addition, LOAD_TYPE=B may affect the operation of this option, in that a further query condition is added to provide the rows from the target table matching any explicit delete row primary keys via a separate query condition.

In another exemplary embodiment, TVT_FILTER_HISTORY is enabled, resulting in lower computing resource utilization in later steps, such as Step 104. Continuing with this embodiment, TVT_FILTER_HISTORY may be effective in reducing resource utilization for tables that are relatively large (e.g., containing millions of rows) and have a relatively large percentage of history rows (e.g., greater than 75% of the table contents).

One advantage of enabling ALL_VT is to cause the use of PK_Latest as the Primary Index (PI), a method of distributing data on a Massively Parallel Processing (MPP) database system via the implementation of a hashing algorithm on one or more specified columns. Advantageously, this option provides for PK_Latest to be less skewed than in tables where the PI has far fewer columns than the PK. In addition, when ALL_VT is enabled, the system reads from the base table with an access locking modifier to avoid any risk of having filters in the base table view. Improved efficiency may be achieved by creating the volatile table (VT) in one step reading from the base table listing explicit column names. This causes the columns to retain the "not null" attribution, unlike creating from the access view. In one alternative, when NUM_PARTITIONS=1, the hash partition is bypassed in this step to conserve computing resources. For example, NUM_PARTITIONS may be set to 1 for a skewed table that otherwise is not large enough for the computing costs associated with partitioning to be offset by the reduction in computing resources associated with processing the data in relatively small partitions.

Step 101

In exemplary embodiments, Step 101 executes for snapshot loads (e.g., LOAD_TYPE=S or B) when ALL_VT=Y and NUM_PARTITIONS>1. In other words, this step may be called for large tables for which the cost of creating a distinct logical partition of the table in separate volatile tables reduces processor usage and/or elapsed execution time more than the cost of adding this step. In one alternative, Step 101 is invoked under identical conditions with Step 100 and completes the process of building volatile tables for the W table, X table and target table to allow logical partitions to be processed separately and in parallel sessions if desired.

A logical partition is created using the HASHBUCKET (HASHROW( )) function, which in an exemplary embodiment creates an integer between one and one million based on the primary key columns excluding the source start timestamp. This provides relatively even partitioning (e.g., partitions of similar sizes) and is a low cost (e.g., in terms of computing resources) method to deterministically assign data row to a distinct partition. The MOD (modulus) function is used against the metadata parameter NUM_PARTITIONS, with 1 to N as the remainder being the metadata value for CURRENT_PARTITION. The code generator instantiates these values in SQL for this step and Step 100 and stores them appropriately for retrieval in the CDW_CDC_SQL table based on table parameters in CDW_CDC_PARM.

An empty volatile copy of the X_table is created. For LOAD_TYPE=B, a third SQL statement may be executed to insert explicit delete rows (e.g., ETL_INDICATOR='D') from the X_table matching the current hash partition. No other rows are read from the X_table except in this case which otherwise is entirely empty at CDC start for LOAD_TYPE='S' or populated only with explicit deletes for LOAD_TYPE='B'.

Step 102

In exemplary embodiments, Step 102 executes on snapshot loads (e.g., LOAD TYPE=S or B), and there may be no code difference in Step 102 between load types S and B. In other words, the building of X_table rows for implicit deletes may be invoked when a complete snapshot of source data is available and for tables that do not depend on a parent table for their existence. These later cases are the parent-child implied delete. In some embodiments, Step 102 is used when no alternative to a snapshot interface, such as using row modification timestamps to load only changed rows, is practical.

In one embodiment, Step 102 includes an implicit delete step. Deletion is determined by detecting that the latest primary key (PK_latest) that is the active row in noncore (end timestamp is null) and is no longer in the incoming snapshot; thus it is presumed to have been deleted in the source system since the last data feed. In one embodiment, the current database timestamp is inserted into SRC_START_TS for use by an apply step (e.g., Apply Step 202). For example, a single apply step may perform implicit and explicit deletes using the current database timestamp. This timestamp becomes the ending timestamp in the target table. Since there is no trigger or deletion time from the source system, the current timestamp is used as the presumed delete time in the source system.

Step 103

In exemplary embodiments, Step 103 is executed for snapshot loads (e.g., LOAD_TYPE=S or B) when NORMALIZE_LATEST=Y, with no code difference between load types S and B. This step may be invoked, for example, when a table has a substantial amount of new rows without new content. In particular, this step eliminates only the next consecutive row per primary key with a newer SOURCE_START_TS than the latest active row in the target table and all other non-key attributes are identical. For example, Step 103 may be effective where a large percentage of W_table rows represent the current target table row with a newer timestamp and no new attribution.

The addition of Step 103 may result in a lower cost process than using Step 104 alone to identify change and load the primary keys of unchanged newer rows into a volatile table named table_KVT, which in turn is used only in Step 104 to exclude rows from the more complex full sequencing and comparison. The computing resource savings of this approach may be substantial, as a full comparison is not required Step 104.

Step 104

In exemplary embodiments, Step 104 loads the X_table with candidate rows from the W_table that differ in at least one attribute, other than the last 3 digits of the source timestamp, from the target table rows (when ALL_VT=N) or the filtered target rows stored in the VT (when ALL_VT=Y). Such rows are initially coded as ETL Indicator 'I', and the SOURCE START TS is uniquely sequenced, if needed, by one microsecond. This process allows non-key attribute changes to be updated into the target table (with a corresponding 1 millisecond addition to the source start TS), such as a re-activation of the latest record previously logically deleted in error. This resolves uniqueness violations with the valid time to ensure only distinct incoming data set rows are loaded.

For example, should a job failure lead to the need to re-run a job, which updates a column in the W_table but not the source starting timestamp, the change data capture system detects the new non-key attribute and inserts a new row into noncore with a sequenced source start time stamp to be unique. In any case, any new source start timestamps for a given primary key also results in new rows provided the non-key attributes differ from the immediately prior row of that primary key, if any, considering both the incoming and existing data.

In some embodiments, the timestamp re-sequencing portion of Step 104 is omitted (e.g., if the source system guarantees unique business keys excluding the source start timestamp). The minimum time increment, for example one microsecond, is added to the source start timestamp of subsequent rows which have an identical primary key with no further sequencing done, relying on an ordering function within the PK, such as the equivalent of the row_number( ) function.

Timestamp re-sequencing is utilized to initially guarantee a unique primary key (with the timestamp) so that update processes are ensured of a one-to-one row assignment. Some of the rows that are sequenced may be subsequently deleted due to not having distinct non-key attribution (see Step 107). With the oldest such row retained, this minimizes the likelihood of new sequencing being introduced (e.g., the oldest row has no time added to it). Collecting or refreshing statistics on the X_table in Step 104 when the X_table is not a volatile table (e.g., ALL_VT is disabled) facilitate achieving optimal load performance.

In exemplary embodiments, the operation of Step 104 varies based on optimization options. For example, when ALL_VT is enabled, Step 104 may receive and operate against volatile tables, rather than conventional or permanent tables. Further, when NORMALIZE_LATEST=Y, an additional sub-query is added at the end of the SQL statement to exclude rows from the _KVT volatile table populated in Step 103, as described above. This avoids the costly self-join of a much larger set of newer but unchanged rows detected in that step. NORMALIZE_LATEST may be enabled in conjunction with ALL_VT.

Step 105

In exemplary embodiments, Step 105 is executed after the X_table is loaded with candidate insert rows in the prior step. Hence the select query does not need to union the incoming rows in the W_table and the delete rows in the X_table to determine the set of primary keys involved in the current run. This approach may result in a relatively small volatile table when incoming W_table rows are eliminated prior to being loaded, particularly in the case of snapshot loads.

Like Step 104, Step 105 may accept and operate against volatile table names when ALL_VT is enabled. Further the ALL_VT option may affect the primary index of the resulting volatile table. When ALL_VT=N, a primary index which matches the W_table and X_table primary index may be used. Conversely, when ALL_VT=Y, the primary index used may be the primary key excluding SOURCE_START_TS, to match the other three volatile tables.

Step 105 may facilitate a substantial performance optimization to reduce the cost of the analysis performed in Steps 106-110, particularly the temporal normalization of Step 107, by using a limited subset of the target table rows stored in a temporary table. The improvement may be pronounced for push interfaces that send only new candidate rows into the W_table and/or when extensive history is present in the target table. Two dimensions of performance improvement may be possible. First, the CDC system may consider only target table rows for primary keys (excluding source start timestamp) contained in the W_table and X_table. For net-change or push interfaces, the more frequent the load, the more efficient this step may be in reducing the cost of the analysis steps. The quantity of data volumes joined against may be reduced by at least a factor of 100 (e.g., 1% per load primary keys presented).

Second, the CDC system may limit the time period of such PK rows from the target table to rows, if any, prior to the oldest incoming W_table and X_table source start timestamp and all subsequent rows. In other words, the CDC system may disregard historical rows not needed in the analysis steps, excluding rows earlier than the prior row to the earliest W_table or X_table for each PK. This optimization may not determine the minimum number of rows, as some intermediate newer target rows may also not be needed. Only rows immediately prior or subsequent to an incoming row are needed for temporal sequencing. This approach to temporal filtering is expected to provide a substantial benefit at a relatively low computational cost. Re-statement of history is generally rare. Hence new incoming data is typically newer than all previously stored data. Hence this step typically reads only the latest current row per PK selected in the first performance improvement dimension described above.

Step 105 may populate a permanent table that is cleared at each run or a temporary table of any form applicable to the DBMS involved. Without loss of generality, a volatile temporary table is selected, with space allocated from the spool of the user account (already large to support the joins involved). The table is defined and materialized automatically with the output of the select statement on the target table without database catalog impacts or the need for create table permission.

In some embodiments, the CDC system assumes that when NUM_PARTITIONS=1 (no partitioning done), any subsequent execution of Step 100 (e.g., the next CDC run) uses a separate database session which will ensure that the volatile table and its contents is destroyed and hence the create table command is allowed without error. When partitioning is used (e.g., NUM_PARTITIONS>1), Step 111 drops this table to allow repeated iterations in a single session, as described below.

Step 106

In exemplary embodiments, Step 106 sequences duplicate full primary keys between the X_table and noncore for insert candidates (e.g., excluding deletes). In some embodiments, sequencing within the X_table may be performed by Step 104. Step 106 may accept and operate against volatile table names when ALL_VT is enabled.

By adding a value starting with one greater than the largest sequence contained in the otherwise unused last three digits of the six sub-second timestamp digits, the CDC system ensures that primary keys are unique and sequenced across both existing and prospective data rows. Newer mini-batch loads receive a new timestamp each time and potentially represent the latest record if the significant portion of the timestamp is unique.

Step 106 may be a prerequisite for Steps 107 and beyond, and eliminates the primary key equality case, as a data record with a duplicate primary key would be sequenced into a unique timestamp if it had new content. Delete records are excluded. In addition, the "stem" (e.g., all but the last three sequenced digits) of the timestamp may be used for subsequent 'group by' operations to allow multiple primary key values differentiated only by timestamp to be sequenced.

Step 107

In exemplary embodiments, Step 107 may accept and operate against volatile table names when ALL_VT is enabled. Step 107 deletes candidate W_table rows that contain no new key or non-key attribution other than the source start timestamp, when compared with the immediately prior row sorting by source start timestamp within the Primary Key. This step represents the compression unit of the process, commonly referred to as temporal normalization.

Computing resources may be wasted when a row including the same data is loaded more than once. Accordingly, Step 104 implements a temporal time period compression unit. However, it may still be desirable to record any changes in the data from "A" to "B", then back to "A". Therefore, the first instance of each distinct row, excluding the starting timestamp, is maintained in the X_table. More specifically, data within X_table is deleted if PK_latest is the same, and if all columns except the timestamp are same as the preceding row when sorted by a source starting timestamp within PK_Latest, within a union of the X_table and noncore table.

In some embodiments, enabling ALL_VT may substantially reduce the computing resource utilization of Step 107, particularly in cases of a limited number of input rows (e.g., a push interface with frequent loads) and a target table with extensive history (e.g., including part revisions). Improvements in this deliberate product join may reach several orders of magnitude. For example, processor utilization and/or memory utilization may be reduced. Further, due to the computing resource utilization improvement, the elapsed time of Step 107 may also be reduced.

In a case of two or more identical consecutive rows (e.g., identical in both PK and attributes), the CDC system may ensure that not all are deleted as redundant when the newest row starts after the end of the current latest expired target row and the earlier candidate rows start within the time period of the latest target row. This situation may be referred to as a "re-activate" case that may occur, for example, when the source system logically deletes data for a time and then restores the data without a newer timestamp. Adding one millisecond to the end timestamp of an expired row allows the CDC system to start a new row even with all other attributes matching the prior row, providing minimum temporal granularity. Specifically, an additional join (aliased as table C) may be included in Step 107 using an online analytical processing (OLAP) query to find the newest source start timestamp, even if logically deleted, and return the start date (or year 2500 if no such row exists) and end date to compare against the latest X_table row. The logic added to the SQL statement may prevent dropping the latest X_table row (A.) if the next latest row (B.) is in the X table but is contained in the time period of the latest C Table target row and thus the B row would be deleted in this step. In exemplary embodiments, the extra computing cost of the C. join is minimal.

Since the computer data warehouse stores temporal effectivity as a begin-end timestamp range or period, knowing that an identical incoming row is still in effect is not new information provided it is the latest row in noncore. Similarly, knowing that two identical rows in the W_table have consecutive but different start times is also not new information, the start time of the earliest row captures this content already in the period between the start and end timestamps, once the end timestamp is assigned in the case of incoming data. In exemplary embodiments, Step 107 accommodates historical updates and removes contiguous duplicates within the X_table. The SQL statement associated with Step 107 may be relatively large if a table has many columns, particularly with the need to check for null values on either side of the comparison. While one commonly utilized system includes a limit of one megabyte (1 MB) per statement, other tools may impose a smaller size limit which may require multiple steps to decompose the non-key attribute comparisons into execution units of reduced complexity or size. Null protection is provided via a Coalesce function when comparing all of the optional columns (generally all non-PK's). The use of a row_number function relies on the distinct source start TS between the X_table and noncore which is ensured by Step 106.

Step 108

In exemplary embodiments, Step 108 may accept and operate against volatile table names when ALL_VT is enabled. Step 108 is the first of two steps that update the extract, transform, and load (ETL) indicator for candidate insert rows ('I'), in this case from 'I' to 'U' for newer updates. As used herein, the term "newer" refers to a data record having a primary key, including the source start time stamp, that is later than the primary key of the latest row within the same PK_latest in noncore, even if flagged as deleted. This step can update the ETL indicator of more than one X_table row within a primary key, provided that each represents new content and was not removed in Step 107. In exemplary embodiments, only the latest active noncore row's ending timestamps is updated in the apply phase (e.g., Apply Step 202 below), which seeks out only the earliest 'U' row per PK to apply its start timestamp as the ending timestamp of the latest noncore row. Step 110, described below, may provide ending timestamps when there is more than one row set to 'U' per PK in the X_table to reflect that all but the latest row will be inserted into target pre-expired.

Step 109

In exemplary embodiments, Step 109 may accept and operate against volatile table names when ALL_VT is enabled. Step 109 allows for new historical rows to be added to the computer data warehouse. This step is the second of two steps that updates the ETL Indicator for candidate insert rows ('I' or 'U'), in this case from 'I' or 'U' to 'O' for updates to 'older' data. There are two cases of "old" updates with ETL Indicator of 'O':1. The source start timestamp is prior to the latest noncore row within the same PK_latest, even if flagged as deleted, which is also referred to as an out of sequence update; and 2. Case 1 is not met, so the start timestamp is newer than any row in PK_latest in noncore, but the start timestamp is also less than the latest ending timestamp in noncore. In other words, this row is a newer update but will be already logically deleted and marked expired once input due to the later expiry date already in noncore. By definition, this row is not a deletion of the latest row and is already flagged as 'U' due to its starting timestamp being newer than the latest noncore start timestamp.

Step 110

In exemplary embodiments, Step 110 may accept and operate against volatile table names when ALL_VT is enabled. Step 110 provides ending timestamps when there is more than one row set to 'U' per primary key in the X_table to reflect that all but the latest row will be inserted into noncore pre-expired. Step 110 sets the ending timestamp of all pre-expired new rows which are not destined to become the latest row in noncore. All rows with the ETL indicator 'O' need an ending timestamp and only those rows with ETL indicator 'U' that are not the latest in the X_table and noncore will also get an ending timestamp equal to the start time of the next row. The 'O' rows get their ending timestamp from the subsequent noncore row, by definition, in the apply phase (e.g., Apply Step 204 described below). This step can be accomplished in a single SQL statement by use of the union or exception operator.

Step 111

In exemplary embodiments, Step 111 may accept and operate against volatile table names when ALL_VT is enabled. Step 111 sets the exact starting timestamp of the row to be logically deleted for all delete rows ('D' ETL indicator) in the X_table and stores this value in the src_end_ts column of that row. This provides an exact full primary key for the apply phase (e.g., Step 206 described below) to locate a single noncore row to expire by finding the prior row from noncore and the X rows to which the delete would apply. The latest row and other pre-expired X_table rows may be updated, but this update is not required, and other steps may expire these rows. The source ending timestamp of delete rows is the source start timestamp of the row to expire and becomes the end timestamp of the row that was in existence at that time. In exemplary embodiments, Step 111 maintains referential integrity when the pre-CDC steps (e.g., steps prior to step 92, shown in FIG. 3) determine cascade and implied delete of children. Step 111 thereby facilitates ensuring that parent records have corresponding historical deletes applied to them without requiring the pre-CDC process to determine the exact timestamp prior to invoking CDC.

Step 112

In exemplary embodiments, Step 112 is executed only when LOAD_TYPE=S (snapshot load) or B (snapshot load with both explicit and implicit deletes) and ALL_VT=Y (using volatile tables). Step 112 loads the resulting data from the volatile X_table into the actual (e.g., permanent or "physical") X_table, allowing parallel sessions to process a unique partition of the table data using session-specific volatile tables.

When LOAD_TYPE=B, Step 112 first deletes the explicit deletes already loaded into the X_table for the current partition. These explicit deletes were loaded in Step 101 into the _XVT table and processed during the current run. This may be done first to prevent duplicate rows in the X_table and to remove the unprocessed explicit deletes. For example, CDC may sequence and set the matching timestamp in the target table during Step 100.

As shown in FIG. 3, when the NUM_PARTITIONS>1, Steps 100 to 112 are repeated (e.g., in serial or in parallel, per the SESSION_PARALLELISM parameter) for each partition from 1 to NUM_PARTITIONS using pre-generated SQL matching the step, partition, and session before executing the apply steps. In the event of an error, the process illustrated by flowchart 70 (shown in FIG. 3) may be halted. In some embodiments, statistics on the actual X_table are collected in the last partition load (e.g., where CURRENT_PARTITION=NUM_PARTITIONS).

Figure 5:
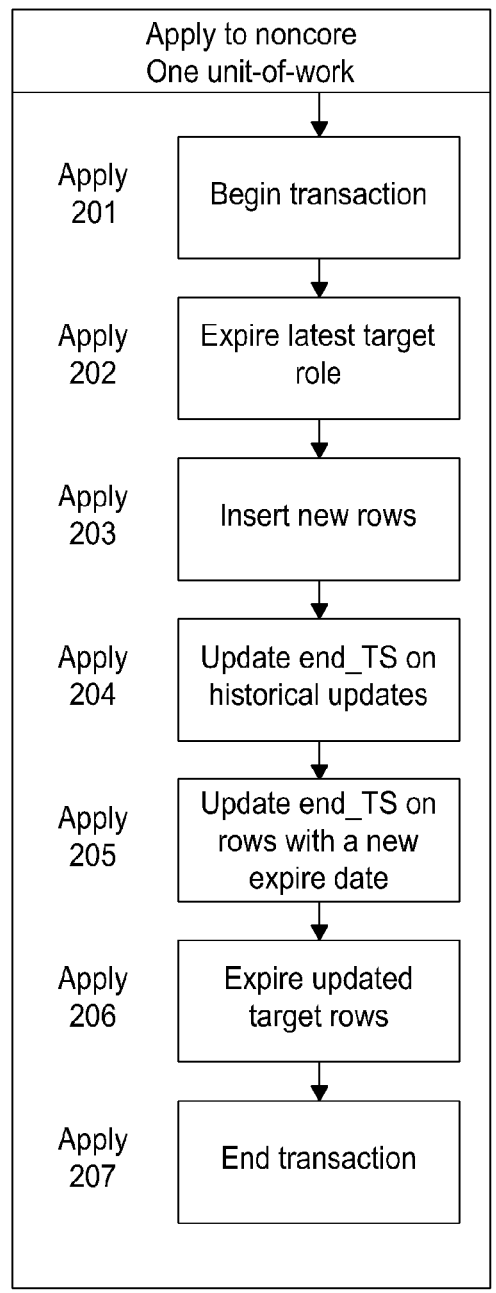
FIG. 5 is a flowchart illustrating an exemplary data application process.

FIG. 5 is a flowchart 200 illustrating an exemplary data application process. In exemplary embodiments, Apply Steps 201-207, described below, are executed together within a single database transaction for each target table, with one initiation per target table. All of Steps 201-207 can be combined into a single multi-statement request, provided error checking and row counts arrays are properly managed. If the steps are submitted individually and a step encounters an error, the execution of Apply Steps 201-207 may be aborted, and no further SQL statements may be submitted. In such a scenario, the entire transaction is canceled or "rolled back." Depending on the source transformation requirements, the CDC process may wait for all source tables to be completed in Steps 100 through 112 before starting any Apply Steps 201-207. The apply steps may be executed in parallel for all applicable tables to maximize the referential integrity of the target database during continuous query access.

Apply Step 201

In exemplary embodiments, Apply Step 201 begins a database transaction in which the SQL statements associated with all subsequent steps up until Apply Step 207, the END TRANSACTION step described below, are fully applied or applied not at all in the event of an error anywhere within the SQL statements. This facilitates rendering the target table in a valid condition, for example, at most one source ending timestamp per PK_latest, at most one active row, unless that row has been logically deleted.

Apply Step 202

Apply Step 202 updates the one latest active row (source ending timestamp is null) per PK_latest to set both ending timestamps (source and CDW) to mark the row as logically deleted for the ETL indicator 'U', which causes the latest noncore timestamp to be expired due to the arrival of one or more newer rows. Processing of all Deletes or indicator 'D' occurs in Apply Step 206. The conditions applied in Step 202 includes that the X_table source start timestamp, which becomes the ending time, is at least as large as the noncore start time (e.g., period>0).

Apply Step 203

In exemplary embodiments, Apply Step 203 is the only apply step to insert new rows to noncore. All ETL indicators except delete result in new noncore rows (I, O and U). Rows may be pre-expired (e.g., due to the X_table source ending timestamp column having a value) or not. As in any step which can assign a transactional or CDW timestamp, this value represents the current timestamp of the apply phase, typically determined prior to the apply steps and used consistently in each, so that a constant start CDW timestamp also uniquely identifies an invocation of CDC on the target table.

Apply Step 204

Apply Step 204 corrects the ending timestamp of the prior noncore row when the new row inserted in Apply Step 203 (one case of the 'O' row) has the latest source start timestamp but that timestamp is earlier than the latest source ending timestamp already in noncore. This is a relatively rare case of the 'O' row, that of an already expired row receiving an out of sequence update with a starting timestamp less than the existing expiry timestamp.

The computing resource utilization of Apply Step 204 may be reduced by including a sub-query against the latest primary key on the X_table to avoid the target table being fully joined to itself, an operation associated with a potentially large processor utilization and potential additional skew when tables have extensive history.

Apply Step 205

Apply Step 205 is invoked for rows marked with the ETL Indicator 'O'. Step 205 joins all X_table 'O' rows to the noncore table to determine the immediately prior noncore row, if any, and then update these rows with the start timestamp of the X_table row as the ending timestamp, as well as updating the CDW ending timestamp. Apply Step 205 completes the process of ladder stepping the source timestamps for out of sequence new rows to provide distinct non-overlapping time periods in the source timestamp. Except for any rows marked as logically deleted, the source start timestamp is the source end timestamp of the immediately prior row (if any) when sorted by source start timestamp within the rest of the primary key.

Apply Step 206

Apply Step 206 is invoked for rows marked with the ETL Indicator 'D' and applies to both historical and current rows from noncore or newly loaded in the batch. This process updates the existing ending timestamps in noncore to the starting timestamp of the delete row (e.g., ETL indicator='D'). For rows directly inserted into the X_table (e.g., parent-child implied delete), the pre-CDC process that builds the row ensures that the ending timestamp is still greater than the start timestamp and less than or equal to the subsequent row's source start timestamp.

To ensure one-to-one joining, the source start timestamp of the noncore target row is stored in the src_end_ts column in the X_table since the source starting timestamp in the X_table is already used to record the source timestamp of the Deletion event, which in the target table becomes the ending timestamp of the row. This final condition embodied in Step 206 accommodates logical deletion of the latest noncore rows and accommodates historical deletes to ensure that when updating the ending timestamp that the new ending timestamp is less (e.g., may shorten the lifespan or period of a row only, not lengthen it, to ensure no overlap of source timestamp start and end periods across rows within a PK_latest).

Apply Step 207

The final Apply Step 207 submits the SQL statement for ending a database transaction, which concludes the transactional scope of all prior statements since the prior begin transaction, provided no errors occurred. If not already performed, statistics may be collected or refreshed on the target table at this time.

FIGS. 6-23 are data flow diagrams that further explain each of the steps associated with the described change data capture system. For example, FIG. 6 is a data flow diagram 300 associated with Step 100, the loading of a partition of incoming data from the noncore data 302. A volatile table 304 is created 306 by selecting a portion of data records from noncore data 302 according to a hash function. Further, where history filtering is enabled (e.g., TVT_FILTER_HISTORY=Y), creating 306 volatile table 304 may include omitting data records from noncore data 302 based on data in the W_table 308. In addition, when history filtering is enabled, and LOAD_TYPE=B, the X_table 310 may be used as input to Step 100.

The following is an example of pseudo code that is associated with Step 100 when TVT_FILTER_HISTORY=N, and LOAD_TYPE=S.

```
Step 100 - Pseudo Code (TVT_FILTER_HISTORY= N,
LOAD_TYPE = S):
Create volatile table _TVT as
Select * from target table
Where HASHBUCKET(HASHROW(PK Latest)) MOD
NUM_PARTITIONS = CURRENT_PARTITION
Primary Index PK Latest;
```

The following is an example of pseudo code that is associated with Step 100 when TVT_FILTER_HISTORY=Y, and LOAD_TYPE=S.

```
Step 100 - Pseudo Code (TVT_FILTER_HISTORY=Y,
LOAD_TYPE = S):
WITH W table minimum primary key and src start TS where
HASHBUCKET(HASHROW(PK
Latest)) MOD NUM_PARTITIONS = CURRENT_PARTITION
Create volatile table _TVT as
Select * from target table
Where full primary key in (
Select newer rows in target table than derived W table with hash partition
Union
Select latest older row in target table relative to derived W table with hash
partition
Union
Select latest row from target table)
Where HASHBUCKET(HASHROW(PK Latest)) MOD
NUM_PARTITIONS = CURRENT_PARTITION
Primary Index PK Latest;
```

The following is an example of pseudo code that is associated with Step 100 when TVT_FILTER_HISTORY=Y, and LOAD_TYPE=B.

```
Step 100 - Pseudo Code (TVT_FILTER_HISTORY=Y,
LOAD_TYPE = B):
WITH W table minimum primary key and src start TS where
HASHBUCKET(HASHROW(PK
Latest)) MOD NUM_PARTITIONS = CURRENT_PARTITION
Create volatile table _TVT as
Select * from target table
Where full primary key in (
Select newer rows in target table than derived W table with hash partition
Union
Select latest older row in target table relative to derived W table with hash
partition
Union
Select latest row from target table)
Or PK_Latest in (select PK_Latest from X table where ETL_Indicator
is D from hash partition)
Where HASHBUCKET(HASHROW(PK Latest)) MOD
NUM_PARTITIONS = CURRENT_PARTITION
Primary Index PK Latest;
```

Figure 7:
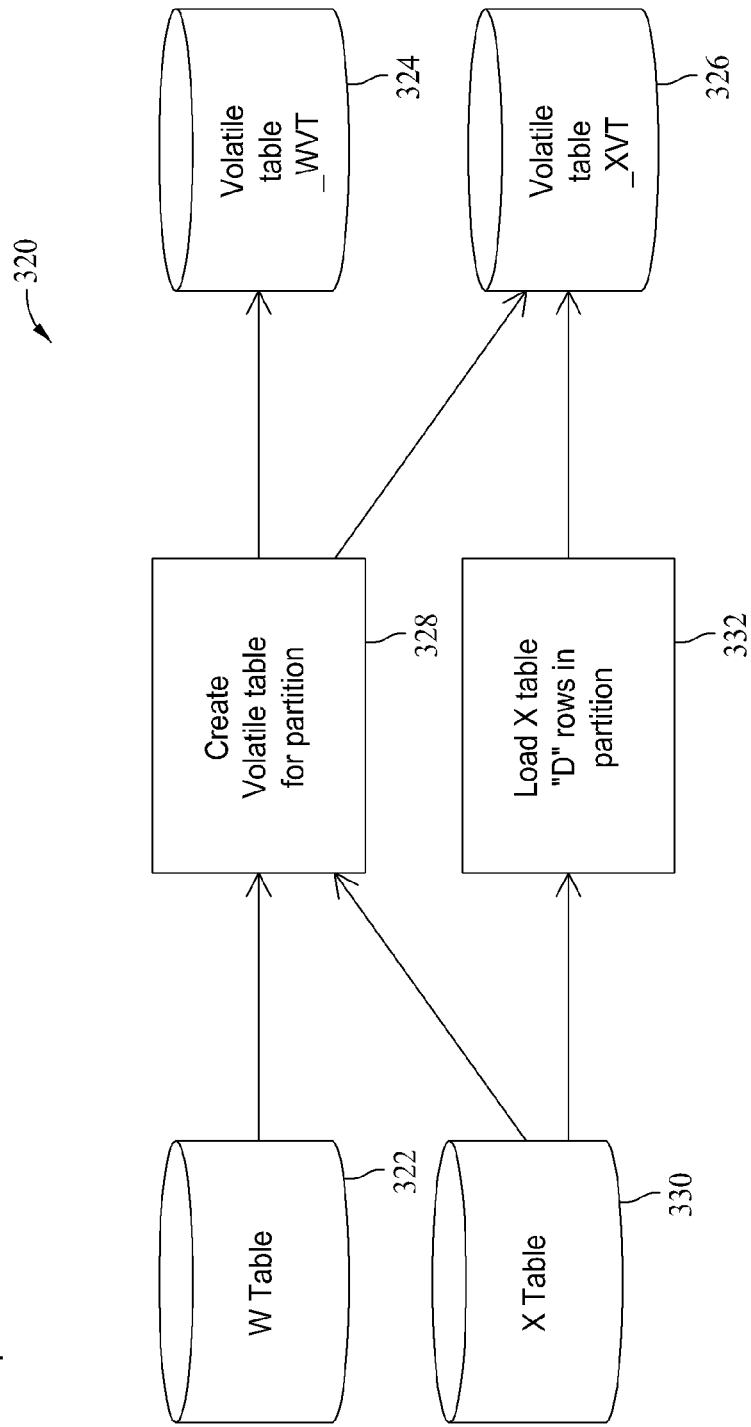
FIG. 7 is a data flow diagram associated with Step 101 shown in FIG. 4.

FIG. 7 is a data flow diagram 320 relating to Step 101, the loading of a partition of incoming data from the W_table 322. Volatile tables _WVT 324 and _XVT 326 are created 328. The _WVT table 324 is loaded by selecting a portion of data records from W_table 322 according to a hash function. When LOAD_TYPE=B, 'D' rows from the X_table 330 are loaded 332 into the volatile table _XVT 326.

The following is an example of pseudo code that is associated with Step 101 when LOAD_TYPE=S.

```
Step 101 - Pseudo Code (LOAD_TYPE = S):
Create volatile table _WVT as
Select * from W table
Where HASHBUCKET(HASHROW(PK Latest)) MOD
NUM_PARTITIONS = CURRENT_PARTITION
Primary Index PK Latest;
Create volatile table _XVT as
X table with no data
Primary Index PK Latest;
```

The following is an example of pseudo code that is associated with Step 101 when LOAD_TYPE=B.

```
Step 101 - Pseudo Code (LOAD_TYPE = B):
Create volatile table _WVT as
Select * from W table
Where HASHBUCKET(HASHROW(PK Latest)) MOD
NUM_PARTITIONS = CURRENT_PARTITION
Primary Index PK Latest;
Create volatile table _XVT as
X table with no data
Primary Index PK Latest;
Insert into _XVT (PK, 4 row marking columns)
Select PK, 4 row marking columns from X table
Where HASHBUCKET(HASHROW(PK Latest)) MOD
NUM_PARTITIONS = CURRENT_PARTITION
AND ETL_INDICATOR = 'D'
```

Figure 8:
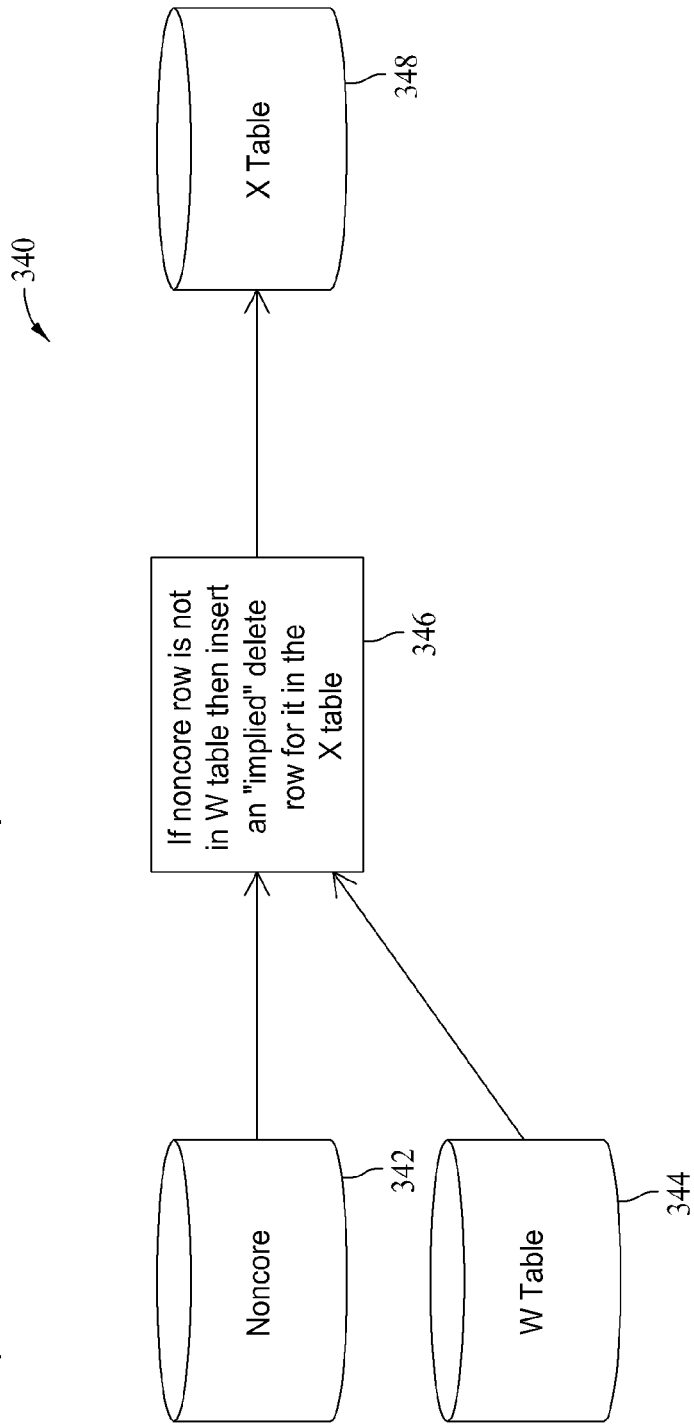
FIG. 8 is a data flow diagram associated with Step 102 shown in FIG. 4.

FIG. 8 is a data flow diagram 340 associated with Step 102, the building of X_table rows for implicit deletes. Diagram 340 illustrates that if a row from the noncore data 342 no longer appears in the W_table 344, it is assumed that it has been deleted from the source. A row is inserted 346 into the X_table 348 with the latest primary key (PK_latest) from the noncore data 342, the current timestamp, and the ETL_Indicator 'D' where a "current" noncore primary key is not in the W_table 344. This is the simple case where a table does not depend on a parent.

The following is an example of pseudo code that is associated with Step 102.

```
Step 102 - Pseudo Code:
Insert into X_table
Select [*, Current_Timestamp, 'D' ] from target
WHERE PK-Latest NOT IN
( Select [PK_Latest] from W-table) ;
```

Figure 9:
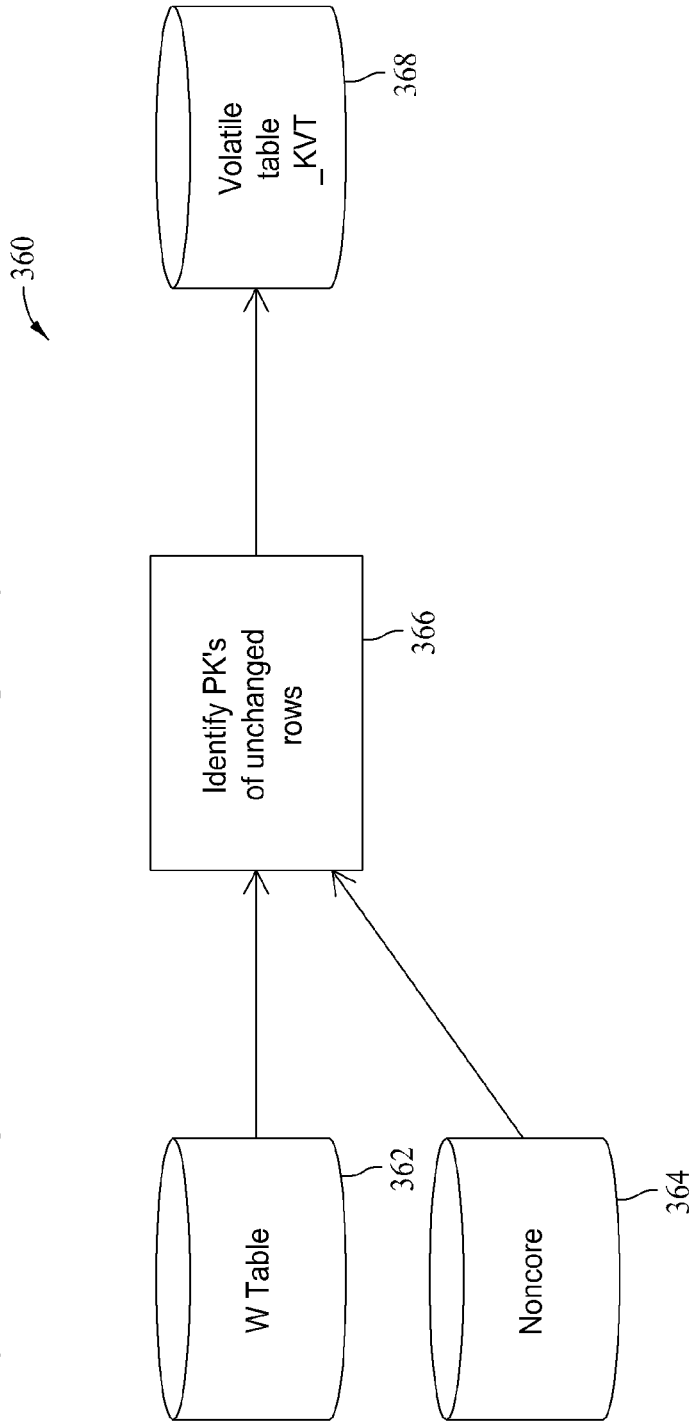
FIG. 9 is a data flow diagram associated with Step 103 shown in FIG. 4.

FIG. 9 is a data flow diagram 360 associated with Step 103. Data records within the W_table 362 are compared to data records within the noncore data 364 to identify 366 the primary keys of unchanged newer rows. These primary keys of the earliest incoming data row with identical content are stored in a volatile table _KVT 368.

The following is an example of pseudo code that is associated with Step 103.

```
Step 103 - Pseudo Code:
Create VT of W table full PK's to exclude in step 104
Select full PK from W table
Where full PK in (
Select earliest full PK row from W table joined to target table
Where target table is latest row and W table is next newest row
And all attributes of both rows are identical excluding source TS
```

Figure 10:
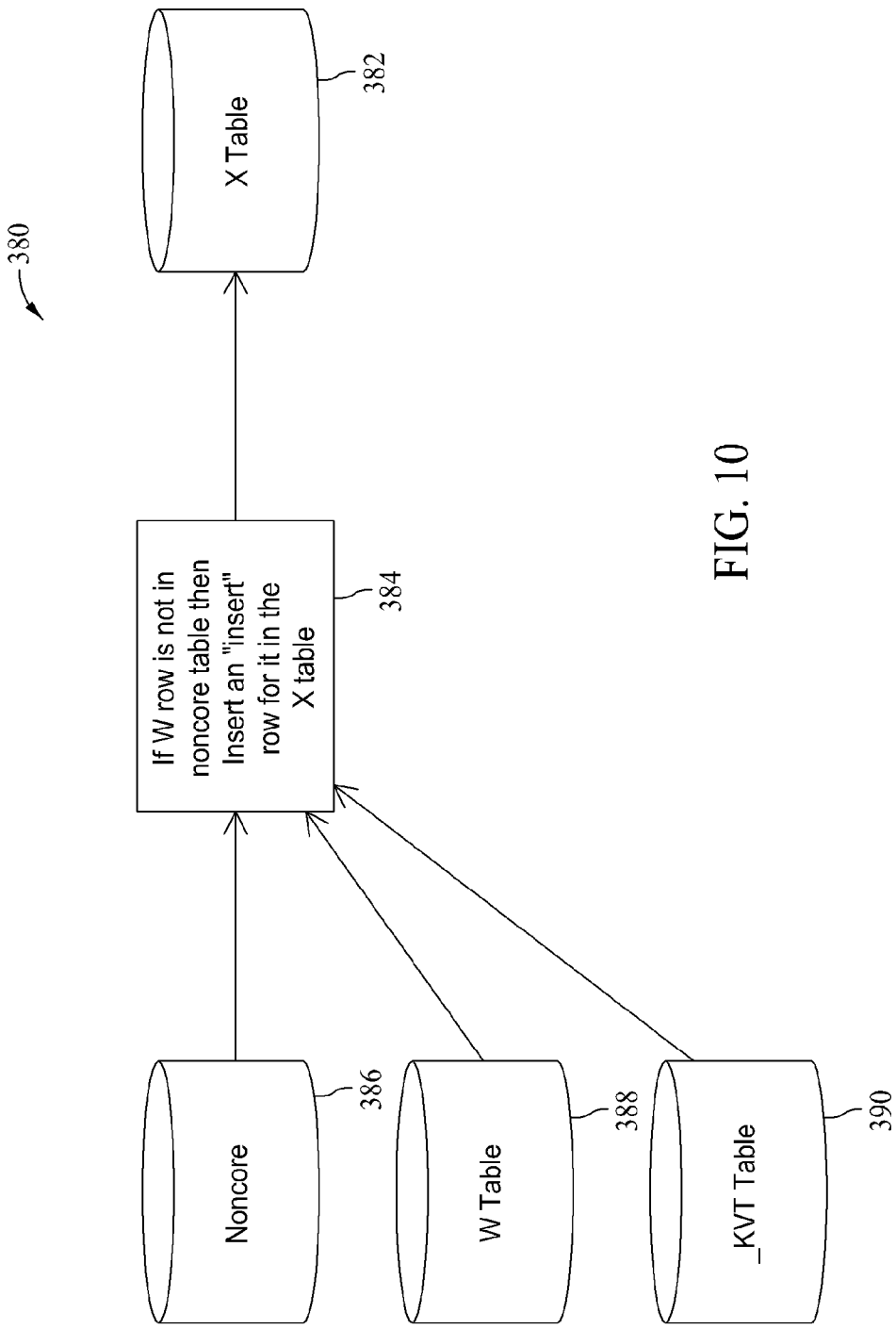
FIG. 10 is a data flow diagram associated with Step 104 shown in FIG. 4.

FIG. 10 is a data flow diagram 380 relating to Step 104, the building of X_table rows for new and changed records, the sequence of non-distinct full primary keys, and the collecting of statistics on the X_table 382. The rows are inserted 384 to the X_table 382 if at least one column is different from all other rows in the noncore data 386, which allows new data history to be loaded into the X_table. By selecting all W_table 388 rows minus (SQL except) all noncore 386 rows, the default ETL indicator is set to I. The change data capture system, and primary key integrity, requires such a step, which may not always be needed if guaranteed in the data. One microsecond is added to the src_start_ts timestamp in W_table 388 for the second to nth rows within the PK_latest. Similarly the last three sub-second digits of the source timestamp, which are reserved for any timestamp sequencing, are excluded from the change comparison between W_table and noncore The following is an example of pseudo code that is associated with Step 104.

```
Step 104 - Pseudo Code:
Insert into X_table
Select [*] from W_table -- 1 microsecond sequencing added to start TS
Where * not in ( -- exclude microsecond sequencing when selecting start
TS
Select [*] from target); -- exclude ns sequencing when selecting start TS
Collect statistics on X_table;
```

Further, when NORMALIZE_LATEST=Y, the _KVT table 390 may be populated with primary keys by Step 103, as described above. In such a scenario, Step 104 excludes (e.g., does not insert 384 into the X_table 382) data records associated with a primary key that appears in the _KVT table 390.

Figure 11:
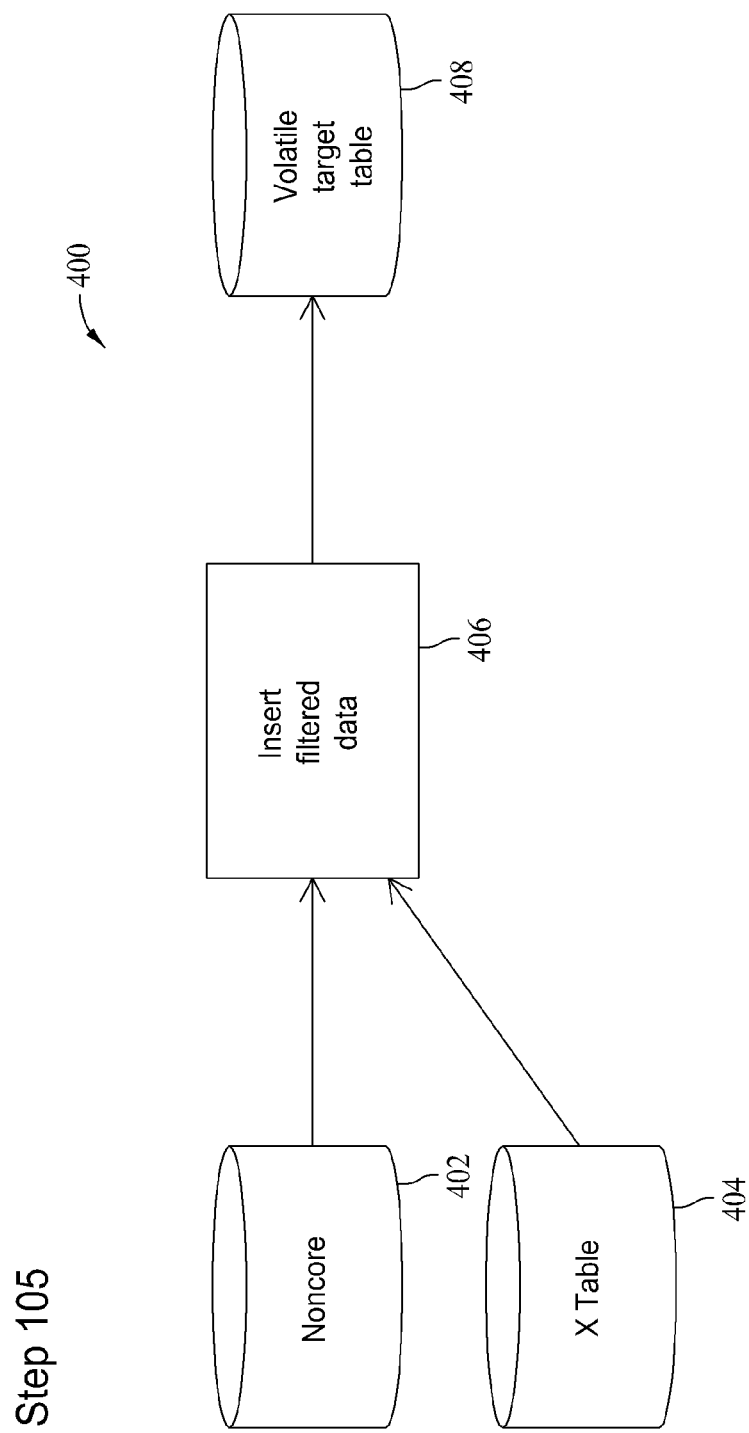
FIG. 11 is a data flow diagram associated with Step 105 shown in FIG. 4.

FIG. 11 is a data flow diagram 400 associated with Step 105. Data records within the noncore data 402 that are associated with a PK_Latest appearing in the X_Table 404 are filtered based on the source start timestamp in the noncore data 402 and inserted 406 into a volatile target table 408.

The following is an example of pseudo code that is associated with Step 105.

```
Step 105 - Pseudo Code:
Insert into Target_Table_VT (create volatile
temporary table via select statement)
Select * from Target Table where
PK_Latest in (select PK_Latest from X_table)
And (SOURCE_START_TS >= MIN SRC_START_TS
in X table for that exact PK
OR SOURCE_START_TS is MAX for PK < MIN SRC_START_TS
in X)
```

Figure 12:
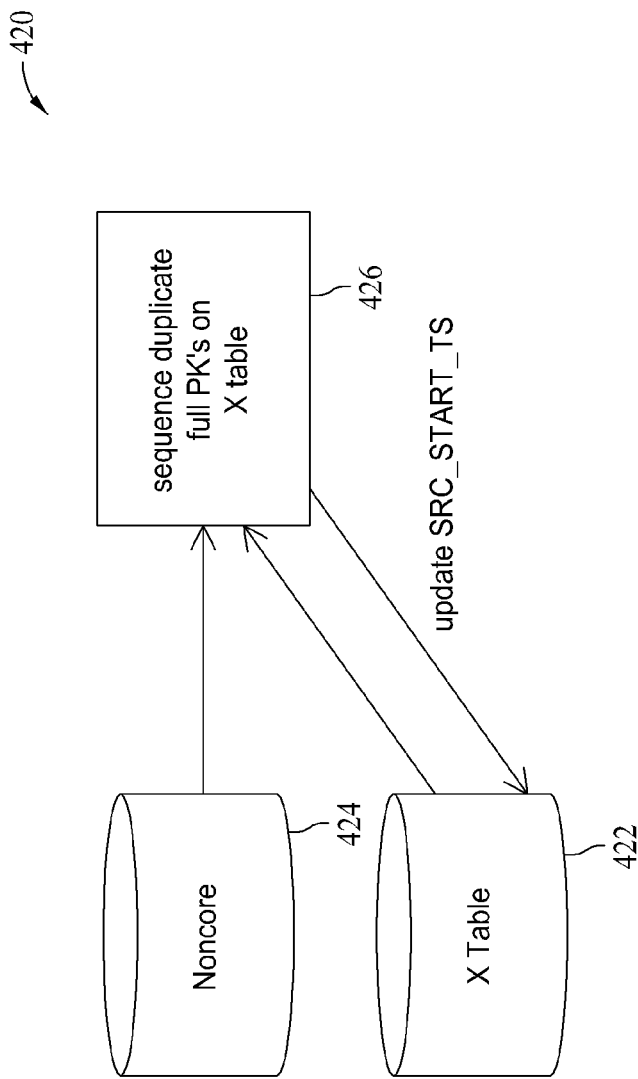
FIG. 12 is a data flow diagram associated with Step 106 shown in FIG. 4.

FIG. 12 is a data flow diagram 420 associated with Step 106, the re-sequencing of X_table 422 rows which will in turn update existing noncore 424 rows. The intent of Step 106 is to update the source starting timestamp associated with the X_table 422 by adding a maximum noncore timestamp (TS_microseconds) to all X_table 'I' rows with otherwise identical start timestamps (excluding last 3 sub-second digits) within the same PK. If new, sequenced (in Step 104) rows 426 for a primary key (PK) are received, having the same timestamp (TS) as existing rows, it is ensured that the new rows fall in sequence after the noncore rows 424.

The following is an example of pseudo code that is associated with Step 106.

```
Step 106 - Pseudo Code:
UPDATE X-alias
FROM X-table X-alias
  , ( SELECT
    PK_Latest
    , CAST ( MAX ( src_start_ts) as char(23) ) F23C
    , substring ( cast (max(source_start_ts) as char(26) ) from 24 for
3 ) + 1 L3C
    , substring ( cast (source_start_ts as char(32) ), from 27 for
    6 ) + 1 L3C
    FROM target
    GROUP BY PK_Latest ,F23C,TSTZ ) QQQ
SET SRC_START_TS
  = F23C || SUBSTRING(CAST((L3C / 1000 +
  (SUBSTRING(cast(xpm.src_start_ts as char(26)) FROM 24 FOR
3))/1000) AS DEC(4,3)) FROM
  4 FOR 3)
WHERE X-alias.PK_Latest = QQQ.PK_Latest
    AND CAST ( X-alias.src_start_ts AS CHAR(23) ) = QQQ.F23C
    AND X-alias.ETL_INDICATOR = 'I' ;
```

Figure 13:
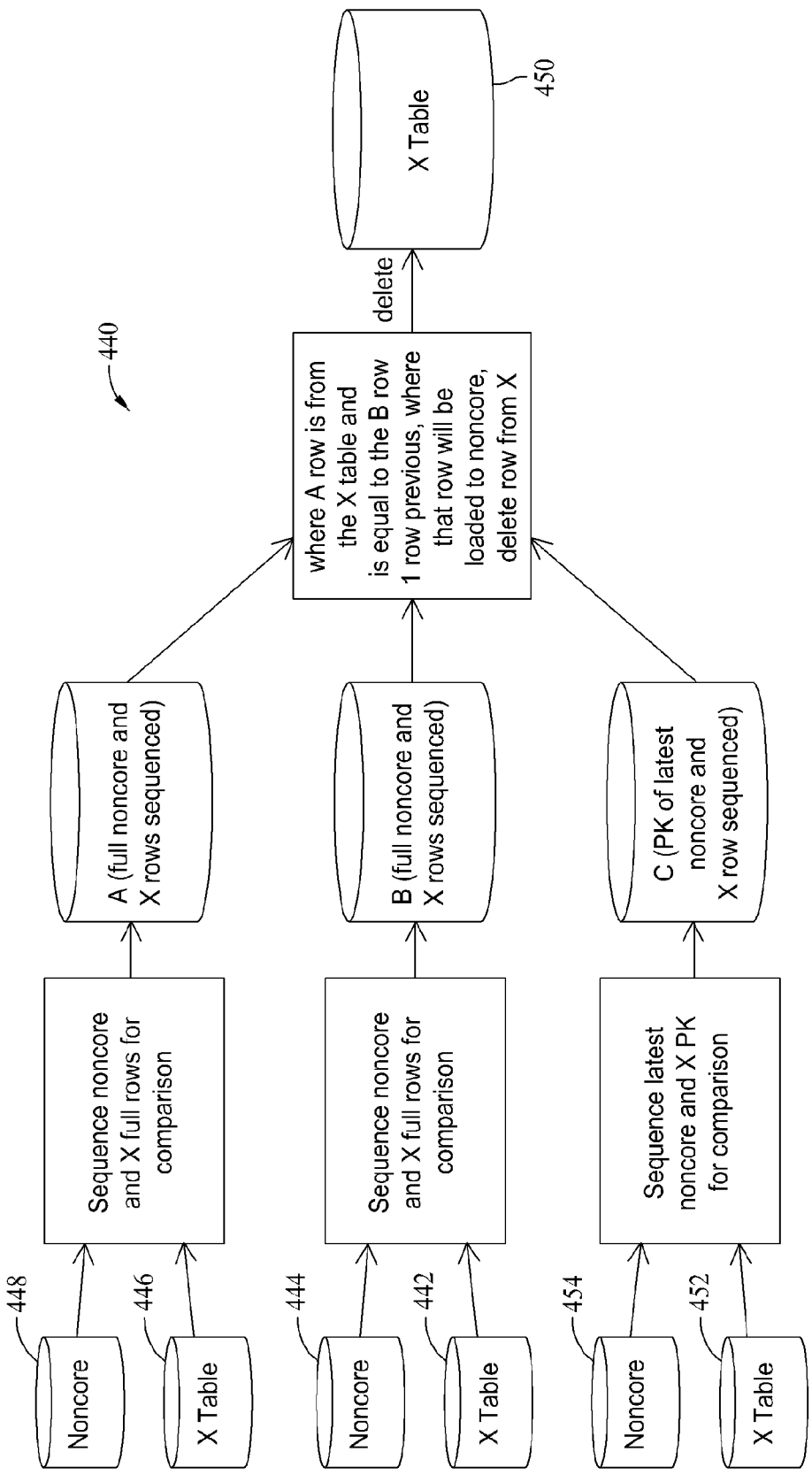
FIG. 13 is a data flow diagram associated with Step 107 shown in FIG. 4.

FIG. 13 is a data flow diagram 440 associated with Step 107, the dropping of contiguous redundant X_table rows, within a union, for example, of the X_table 442 and noncore table 444 and additionally a union of X_table 446 and noncore table 448. The two unions are joined on primary key to sequence rows and allow detection of consecutive rows duplicated as to all non-key attribution and then joined to the newest target table PK. Step 107 represents a recognition that resources are wasted when a row including the same data is loaded more than once and implements the temporal time period compression unit. However, it is still desirable to record any changes in the data from "A" to "B", then back to "A". Therefore, the first instance of each distinct row, excluding the starting timestamp, is maintained in the X_table 450. More specifically, data within X_table 450 is deleted if PK_latest is the same, and if all columns except the timestamp are same as the preceding row when sorted by a source starting timestamp within PK_Latest, within a union of the X_table and noncore table.

In exemplary embodiments, an additional join (aliased as table C) of the X_table 452 and the noncore table 454 is included to find the newest source start timestamp, even if logically deleted, and return the start date (or year 2500 if no such row exists) and end date to compare against the latest X_table row.

The following is an example of pseudo code that is associated with Step 107.

```
Step 107 - Pseudo Code:
Delete from X_table where PK IN (
(Select PK from
(Select A.* from
    (Select *, table_source, Row_Number( ) from X_table union
    noncore partition by PK_Latest Order by SRC_START_TS to
create Row_Number) A
    INNER JOIN (Select *, table_source, Row_Number( ) from
X_table union noncore
    partition by PK_Latest Order by SRC_START_TS to create
Row_Number) B
Where A.PK_Latest = B.PK_Latest
    and B.Row_Number = A.Row_Number – 1
    and all non-key attribute are the same (values equal or both null)
)
AND A.Table Source = 'X'
Left Outer Join (Select PK_Latest, If not null then Source Start TS else
Year 2500,
SOURCE_END_TS
    From Target partition PK_Latest and present newest Source Start ts)
C ON A.PK_Latest = C.PK_Latest
WHERE ( B.Table Source = 'X'
    AND A.Time period is newer than the latest target row
```

Figure 14:
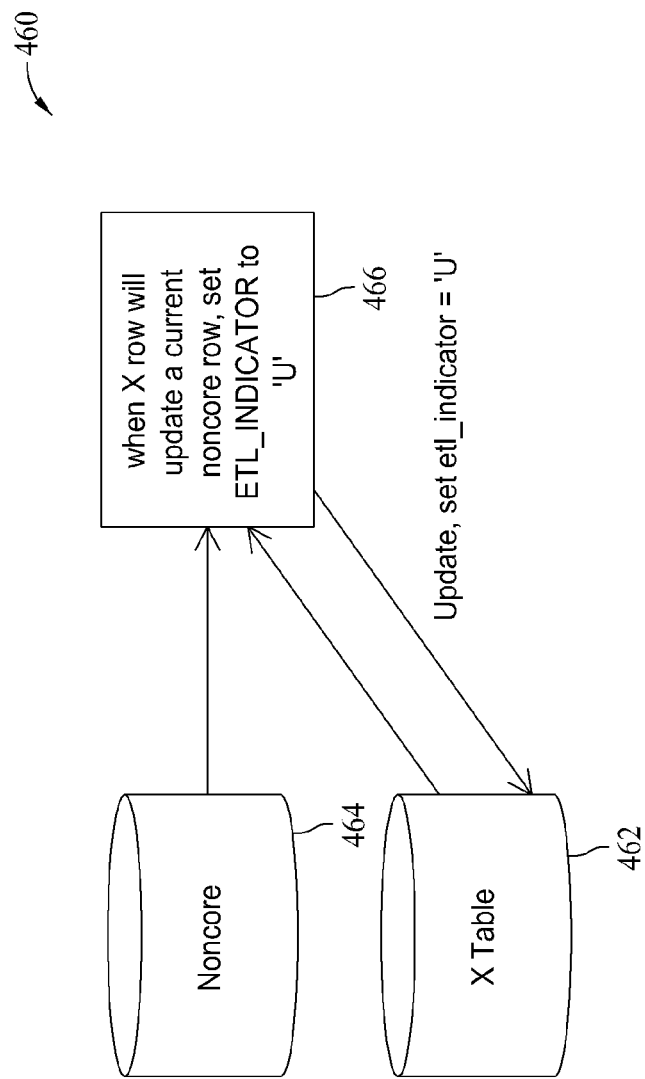
FIG. 14 is a data flow diagram associated with Step 108 shown in FIG. 4.

FIG. 14 is a data flow diagram 460 associated with Step 108, the marking of rows of X_table 462 which are updates to current rows within the noncore data 464. In Step 108, to update 466 the X_table, the ETL_Indicator is set to 'U' on 'I' rows that update existing noncore "current" rows, where the incoming source timestamp is greater than the latest source timestamp in the noncore table. In the Apply Step 202 described herein, the starting timestamp of the earliest of these "U" rows is used within a primary key to expire the latest noncore row.

The following is an example of pseudo code that is associated with Step 108.

Step 108 - Pseudo Code:

```
UPDATE X_tbl
FROM X_TABLE X_tbl
    , (select PK_Latest
    , max(src_start_ts) src_start_ts
    from target
    group by PK_Latest ) NC_tbl
SET ETL_INDICATOR = 'U'
WHERE X_tbl.PK_Latest = NC_tbl.PK_Latest
    AND X_tbl.SRC_START_TS > NC_tbl.SRC_START_TS
    AND X_tbl.ETL_INDICATOR = 'I' ;
```

Figure 15:
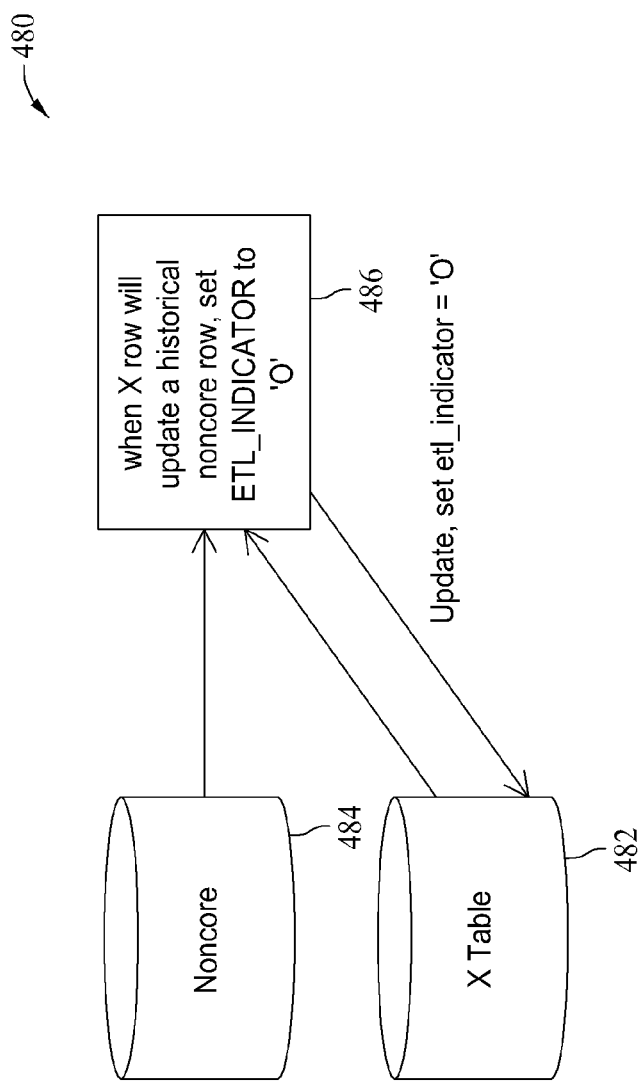
FIG. 15 is a data flow diagram associated with Step 109 shown in FIG. 4.

FIG. 15 is a data flow diagram 480 illustrating Step 109, the marking of rows in X_table 482 which are updates to a "historical" row in the noncore data 484. Flow diagram 480 relates to updates that are being applied out of sequence. In Step 109, to update 486 data within X_table 482, the ETL_Indicator is set to 'O' in rows previously set to I or U for the updating of existing noncore "history" rows. In such rows, incoming source timestamps are less than the latest source start timestamps in noncore rows, once the entire X_table and noncore table rows are considered. This is achieved by combining timestamp comparisons from both noncore and X_table to achieve an overall maximum per PK_latest. Alternatively, the incoming source timestamp is less than the latest source ending timestamp, therefore the row should be pre-expired. These "O" rows update the ending timestamp in the noncore data to correct a historical sequence. These updates are being applied out of time sequence, so most get the ending timestamp of the next row in Step 110. Others get the ending time stamp in Apply Step 204.

The following is an example of pseudo code that is associated with Step 109.

Step 109 - Pseudo Code:

```
UPDATE X_tbl
FROM X_TABLE X_tbl
    , (select PK_Latest
    , max(src_end_ts) max_end_ts
    , max(src_start_ts) max_start_ts
    from target
    group by PK_Latest ) Max_tbl
SET ETL_INDICATOR = 'O'
WHERE X_tbl.PK_Latest = Max_tbl.PK_Latest
    AND ( (X_tbl.SRC_START_TS < Max_tbl.MAX_END_TS
        OR ( X_tbl.SRC_START_TS <
        Max_tbl.MAX_START_TS ) )
    AND X_tbl.ETL_INDICATOR IN ('I', 'U') ;
```

Figure 16:
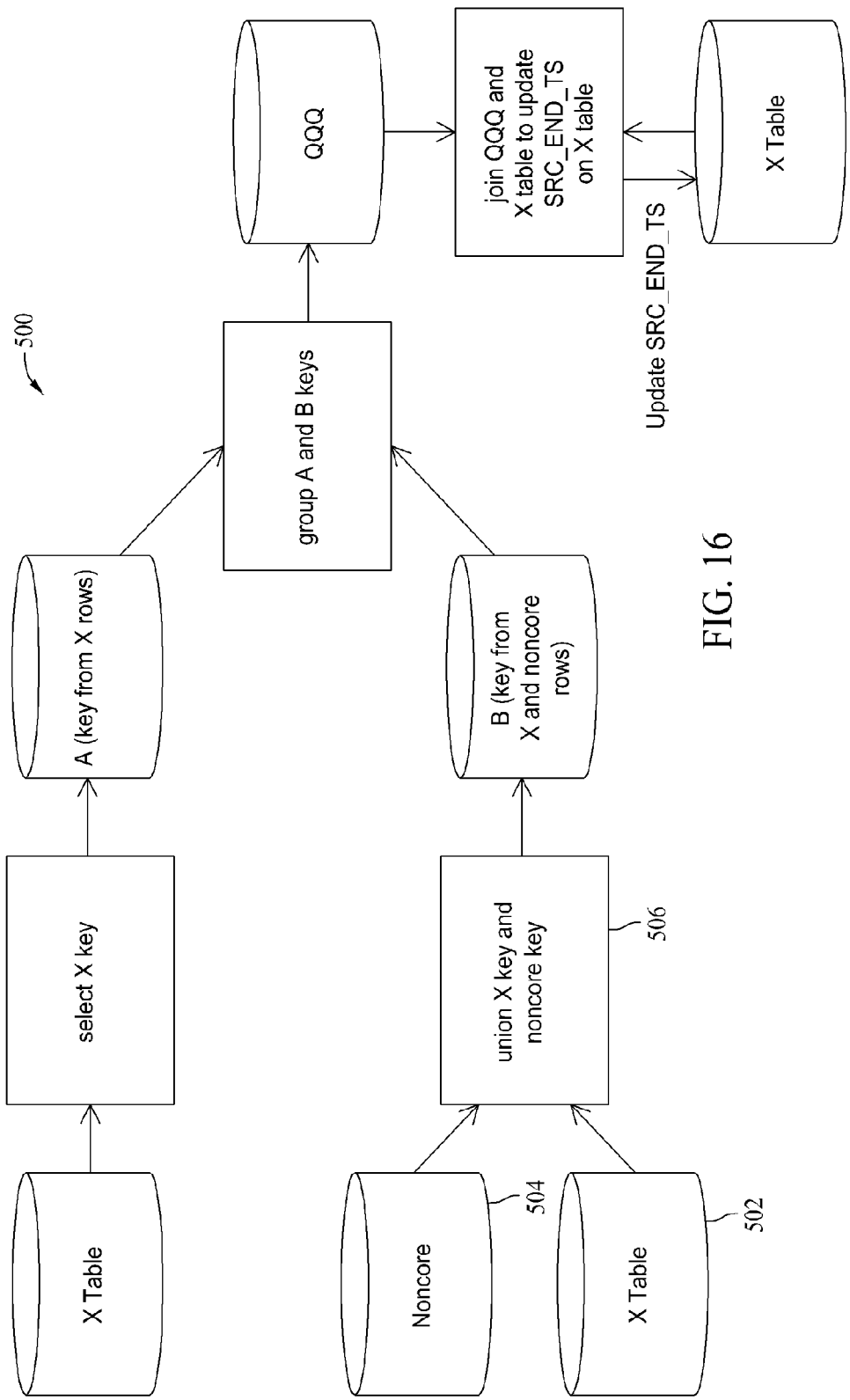
FIG. 16 is a data flow diagram associated with Step 110 shown in FIG. 4.

FIG. 16 is a data flow diagram 500 illustrating Step 110, the expiring of X_table rows ('O' or 'U') that have already been updated in noncore or in the X_table. The ending timestamp in X_table rows is set to the starting timestamp of the prior row (either in noncore or X_table). Rows where the ETL_Indicator is set to 'O' allow for history updates to be loaded. These are incoming rows which are not the latest row within their primary key, that is, they have already been updated, across X_Table 502 and noncore 504 via the union 506. They are inserted into the noncore data as history rows based on their ending timestamp.

The following is an example of pseudo code that is associated with Step 110.

Step 110 - Pseudo Code:

```
Update X-tbl
FROM X-table X-tbl
    , ( Select AAA.PK-Latest, min(BBB.START_TS) as END_TS
    From ( Select PK
        From X-table ) AAA,
        ( Select PK
        From X-table
UNION
        Select PK
        From target ) BBB
        Where BBB.PK_Latest = AAA.PK_Latest
        And BBB.START_TS > AAA.START_TS
        Group By AAA.PK
    ) QQQ
SET END_TS = QQQ.END_TS
WHERE X-table.PK = QQQ.PK
    and X-table.ETL_Indicator IN ('O', 'U');
```

Figure 17:
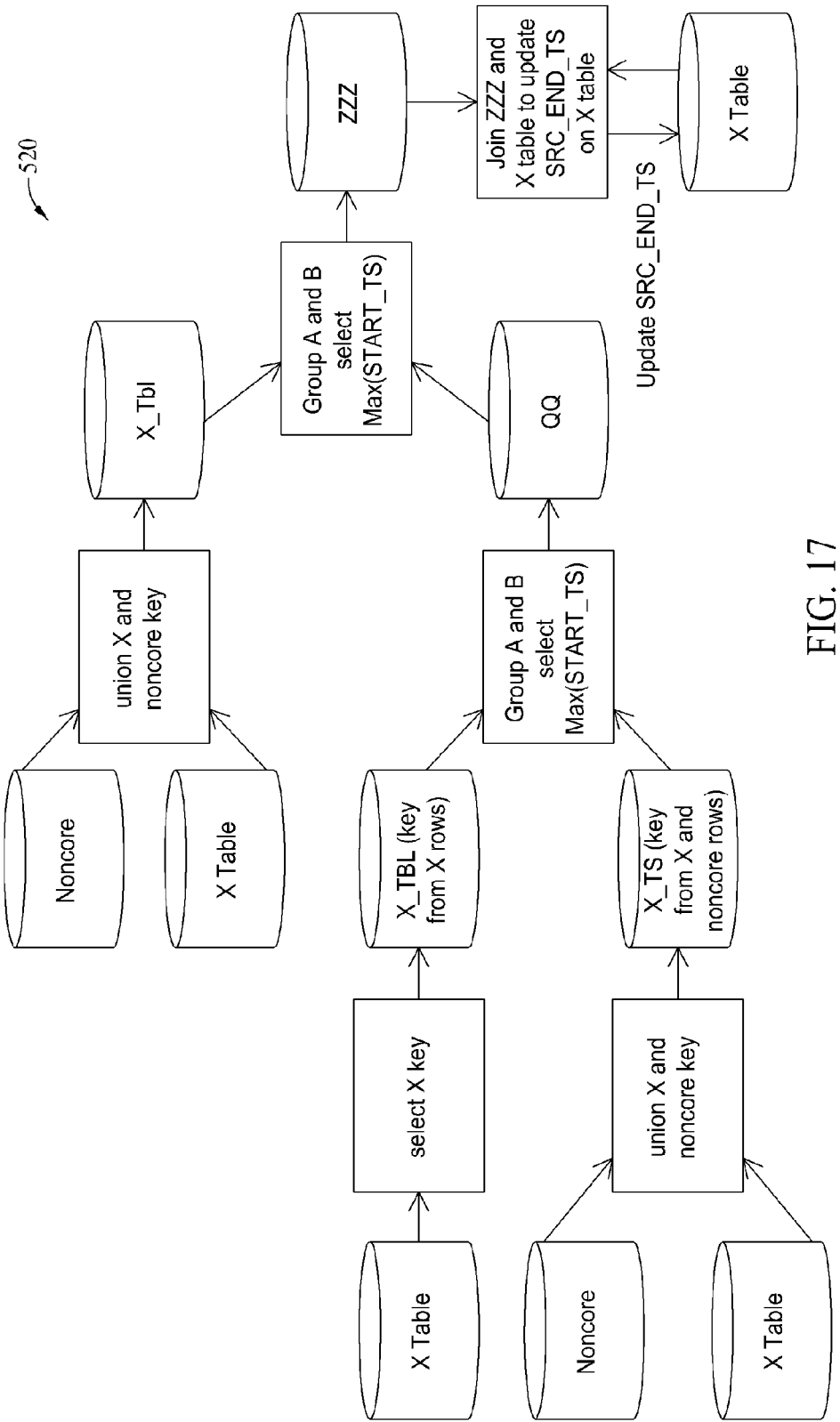
FIG. 17 is a data flow diagram associated with Step 111 shown in FIG. 4.

FIG. 17 is a data flow diagram 520 illustrating Step 111, the providing of a full key (with source start timestamp) for all delete rows (ETL_Indicator of 'D') by finding the timestamp of the latest noncore row that the logical delete applies to. More specifically, the ending timestamp is set on X_table rows to the starting timestamp of the immediately prior X_table row or noncore row, based on a delete timestamp. These rows to be logically deleted are in addition to already prepared parent-child implied or cascade delete rows prior to change data capture. Such cases are executed in Apply Step 206.

The following is an example of pseudo code that is associated with Step 111.

Step 111 - Pseudo Code:

```
Update X-tbl
FROM X-table X-tbl
    , ( Select AAA.PK-Latest, min(BBB.START_TS) as END_TS
    From ( Select PK
        From X-table ) AAA,
        ( Select PK, Max Start TS
        From X-table
UNION
        Select PK, Max Start TS
        From target ) BBB
        Where BBB.PK_Latest = AAA.PK_Latest
        And BBB.START_TS > AAA.START_TS
        Group By AAA.PK, BBB.Max Start TS
    ) QQQ
SET END_TS = QQQ.END_TS
WHERE X-table.PK = QQQ.PK and X-table.Start TS < QQQ.Start TS
    and X-table.ETL_Indicator = 'D';
```

Figure 18:
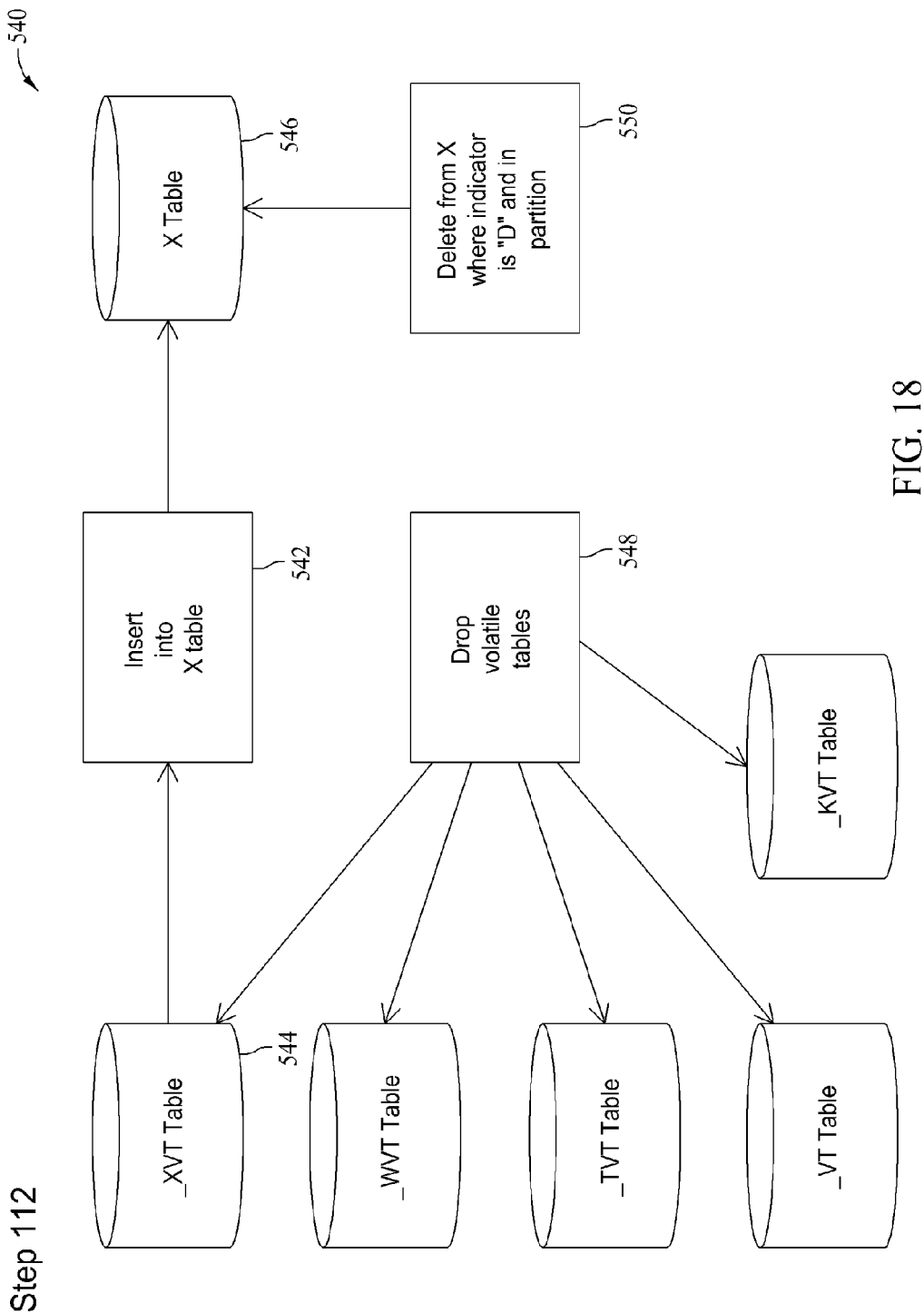
FIG. 18 is a data flow diagram associated with Step 112 shown in FIG. 4.

FIG. 18 is a data flow diagram 540 illustrating Step 112, the insertion 542 of data records from the _XVT table 544 into the X_table 546. After the data has been inserted 542 into the X_Table 546, Step 112 includes dropping 548 all volatile tables created for the partition. In certain cases (e.g., when NORMALIZE_LATEST=N, and LOAD_TYPE=B), Step 112 may include deleting 550 rows in the X_table 546 with an ETL indicator of 'D' that are in the current partition.

The following is an example of pseudo code that is associated with Step 112 when NORMALIZE_LATEST=N, and LOAD_TYPE=S.

```
Step 112 - Pseudo Code (NORMALIZE_LATEST =
            N, LOAD_TYPE = S):

INSERT INTO X-table SELECT * FROM _XVT;
DROP TABLE _XVT;
DROP TABLE _WVT;
DROP TABLE _TVT;
DROP TABLE _VT;
COLLECT STATISTICS X-table; (last partition only)
```

The following is an example of pseudo code that is associated with Step 112 when NORMALIZE_LATEST=Y, and LOAD_TYPE=S.

```
Step 112 - Pseudo Code (NORMALIZE_LATEST =
            Y, LOAD_TYPE = S):

INSERT INTO X-table SELECT * FROM _XVT;
DROP TABLE _XVT;
DROP TABLE _WVT;
DROP TABLE _TVT;
DROP TABLE _VT;
DROP TABLE _KVT
COLLECT STATISTICS X-table; (last partition only)
```

The following is an example of pseudo code that is associated with Step 112 when NORMALIZE_LATEST=N, and LOAD_TYPE=B.

```
Step 112 - Pseudo Code (NORMALIZE_LATEST =
            N, LOAD_TYPE = B):

DELETE FROM X-table
WHERE ETL_INDICATOR = 'D'
AND HASHBUCKET(HASHROW(USAGE_INSTANCE_NUM_ID))
MOD
NUM_PARTITIONS = 0;
INSERT INTO X-table SELECT * FROM _XVT;
DROP TABLE _XVT;
DROP TABLE _WVT;
DROP TABLE _TVT;
DROP TABLE _VT;
COLLECT STATISTICS X-table; (last partition only)
```

The first apply step, Step 201 ensures that all subsequent SQL statements up until Apply Step 207, the END TRANSACTION, are fully applied or applied not at all in the event of an error anywhere within the statements. This is necessary to leave the target table in a valid condition (e.g. at most one SOURCE_END_TS per PK_latest, at most one active row, unless that row has been logically deleted).

The following is an example of pseudo code that is associated with Apply Step 201.

```
Step 201 Pseudo Code:

START TRANSACTION
```

Figure 19:
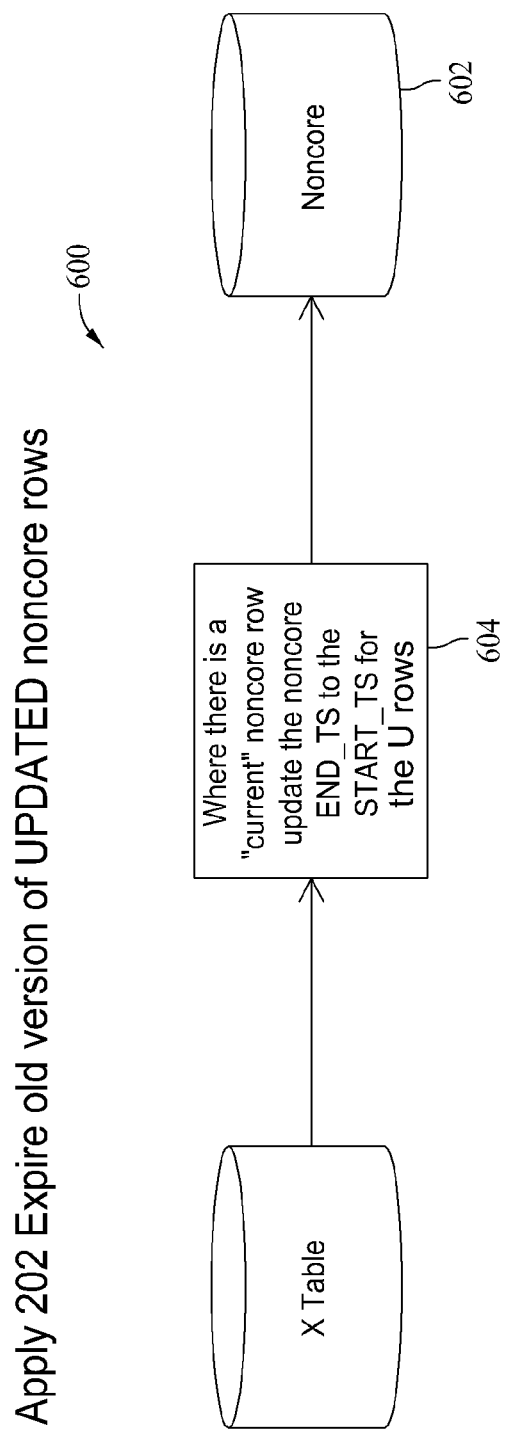
FIG. 19 is a data flow diagram associated with Apply Step 202 shown in FIG. 5.

FIG. 19 is a data flow diagram 600 illustrating Apply Step 202, which is the expiration of a prior version of an updated noncore 602 row. To update the noncore rows, the ending time stamp is updated 604 from null to the starting timestamp of the earliest successor row within the latest primary key from X_table 606 where the ETL Indicator is set to 'U'. This step covers setting the ending timestamp of the latest noncore row for updates, with the ending timestamp of one row being the starting timestamp of the next row.

The following is an example of pseudo code that is associated with Apply Step 202.

```
Step 202 - Pseudo Code

UPDATE noncore
SET SOURCE_END_TS = MIN(X-table.SRC_START_TS)
    CDW_END_TS = current timestamp for table
WHERE noncore.PK_Latest = X-table.PK_Latest
    AND SOURCE_END_TS IS NULL
    AND X-table.SRC_START_TS >=
    noncore.SOURCE_START_TS
    AND X-table.ETL_INDICATOR = 'U'
    AND src_start_ts is the earliest within the PK_Latest;
```

Figure 20:
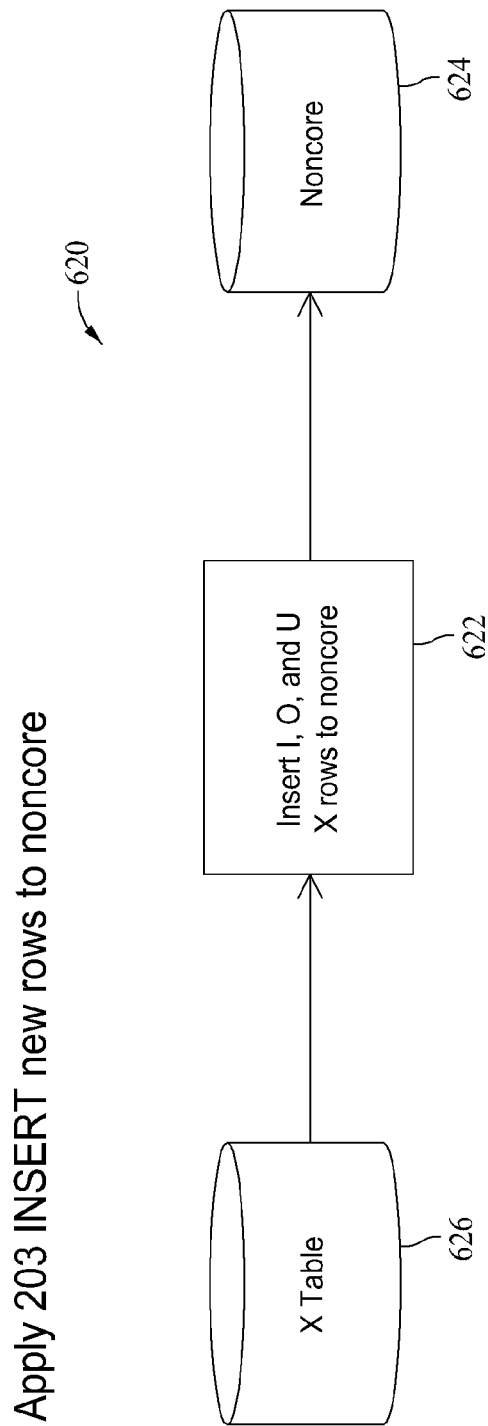
FIG. 20 is a data flow diagram associated with Apply Step 203 shown in FIG. 5.

FIG. 20 is a data flow diagram 620 illustrating Apply Step 203, which is the insertion 622 of new rows into noncore 624 for ETL indicators I, O and U. All incoming rows are loaded, except rows marked for deletion. Rows having an ETL_Indicator of I and some having an ETL_Indicator of U, become the latest, remaining U and all O rows are pre-expired. A case statement is used to set the ending timestamp to a fixed, current timestamp when the ending timestamp for the source is not null in the X_table 626 (ETL indicators O and U in most cases). All incoming rows are loaded, except deletes. I rows and one U row per primary key can become the latest (no ending timestamp) while additional U rows are pre-expired.

The following is an example of pseudo code that is associated with Apply Step 203.

```
Step 203 - Pseudo Code

INSERT into noncore
Select * from X-table
Where ETL_Indicator = 'I', 'O' or 'U' ;
```

Figure 21:
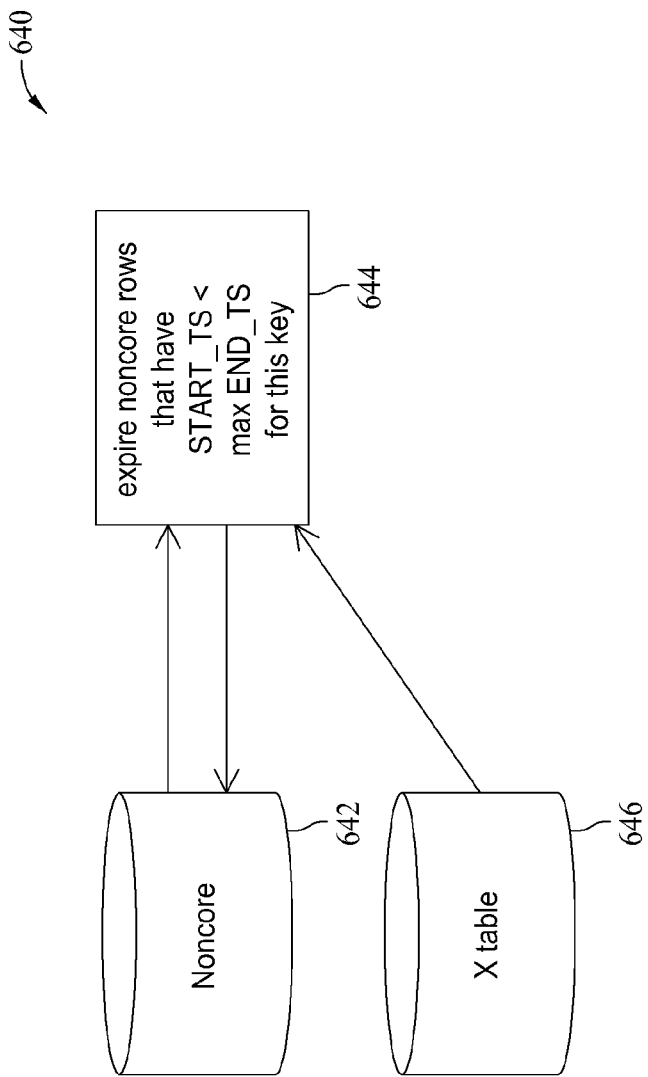
FIG. 21 is a data flow diagram associated with Apply Step 204 shown in FIG. 5.

FIG. 21 is a data flow diagram 640 illustrating Apply Step 204, which is the updating of a newly inserted 'O' row in the noncore data 642 when it should inherit a later expiry date from the prior row. This is the case where a row has already been deleted (expired 644) but an out-of-sequence update is received that happened before the delete took place but after the start time of the logically deleted row. The newly inserted row should get the later ending timestamp since it has the latest source starting timestamp. Apply Step 204 may filter only PK's from the X_table 646.

The following is an example of pseudo code that is associated with Apply Step 204.

```
Step 204 - Pseudo Code

UPDATE NC_Tbl
FROM
    noncore NC_Tbl,
    ( SELECT PK_Latest MAX ( SOURCE_END_TS )
    MAX_END_TS
        FROM noncore
        WHERE ( PK_Latest in
        ( SELECT PK_Latest FROM X_table ) )
        GROUP BY PK_Latest) Max_NC
SET SOURCE_END_TS = Max_NC.MAX_END_TS,
    CDW_END_TS = current timestamp for table
WHERE NC_Tbl.PK_Latest = Max_NC.PK_Latest
    AND NC_Tbl.SOURCE_START_TS <
```

| Step 204 - Pseudo Code |
| --- |
| Max_NC.MAX_END_TS<br>AND NC_Tbl.SOURCE_END_TS IS NULL ; |

Figure 22:
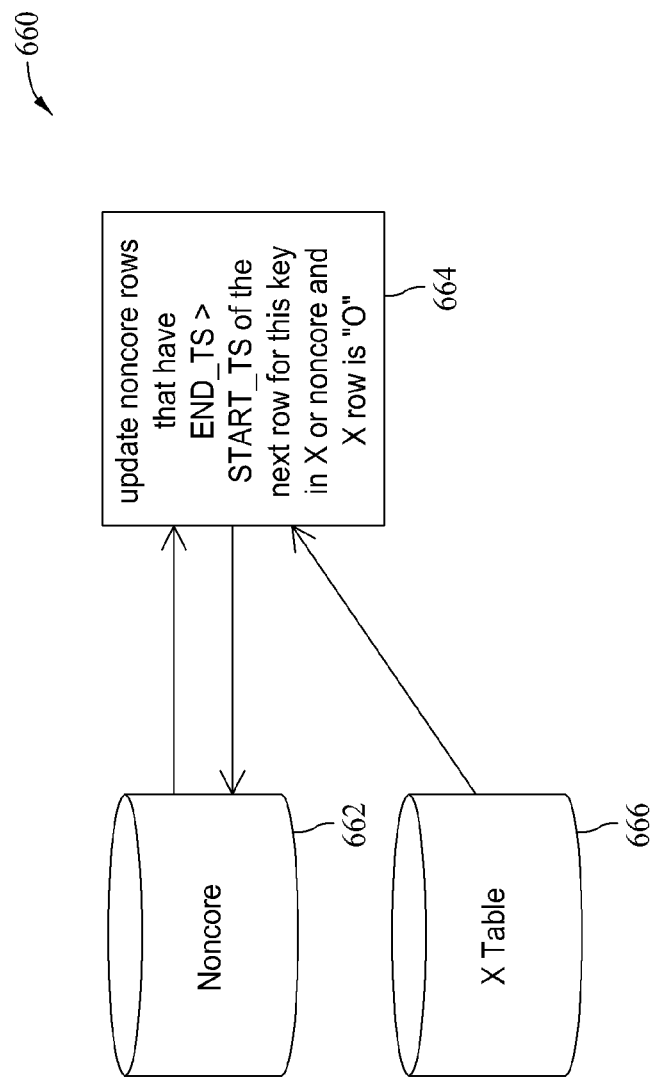
FIG. 22 is a data flow diagram associated with Apply Step 205 shown in FIG. 5.

FIG. 22 is a data flow diagram 660 illustrating Apply Step 205, which is the updating of the ending timestamp on noncore 662 rows already expired, but which have had a "missed" update 664 inserted immediately thereafter during Apply Step 203. In Apply Step 205, the "O" rows are used from the X_table 666, to correct the ending timestamp of rows which now have a different successor row due to the 'O' row being inserted. The new ending timestamp is the starting timestamp of the newly inserted 'O' row.

The following is an example of pseudo code that is associated with Apply Step 205.

| Step 205 - Pseudo Code |
| --- |
| UPDATE NC_Tbl<br>FROM noncore NC_Tbl ,<br>( SELECT NC_Tbl.PK_Latest<br>    , X_Tbl.SRC_START_TS SRC_END_TS<br>    , MAX ( NC_Tbl.SOURCE_START_TS )<br>    SOURCE_START_TS<br>    FROM ( SELECT PK_Latest<br>       , SRC_START_TS<br>       FROM X-Table<br>       WHERE ETL_INDICATOR = 'O' ) X_Tbl<br>    , ( SELECT PK_Latest<br>       , SOURCE_START_TS<br>       FROM noncore ) NC_Tbl<br>    WHERE NC_Tbl.PK_Latest = X_Tbl.PK_Latest<br>    AND NC_Tbl.SOURCE_START_TS < X_Tbl.SRC_START_TS<br>    GROUP BY NC_Tbl.PK_Latest , X_Tbl.SRC_START_TS<br>    ) QQQ<br>SET SOURCE_END_TS = QQQ.SRC_END_TS,<br>    CDW_END_TS = current timestamp for table<br>WHERE NC_Tbl.PK_Latest = QQQ.PK_Latest<br>    AND NC_Tbl.SOURCE_START_TS =<br>    QQQ.SOURCE_START_TS ; |

Figure 23:
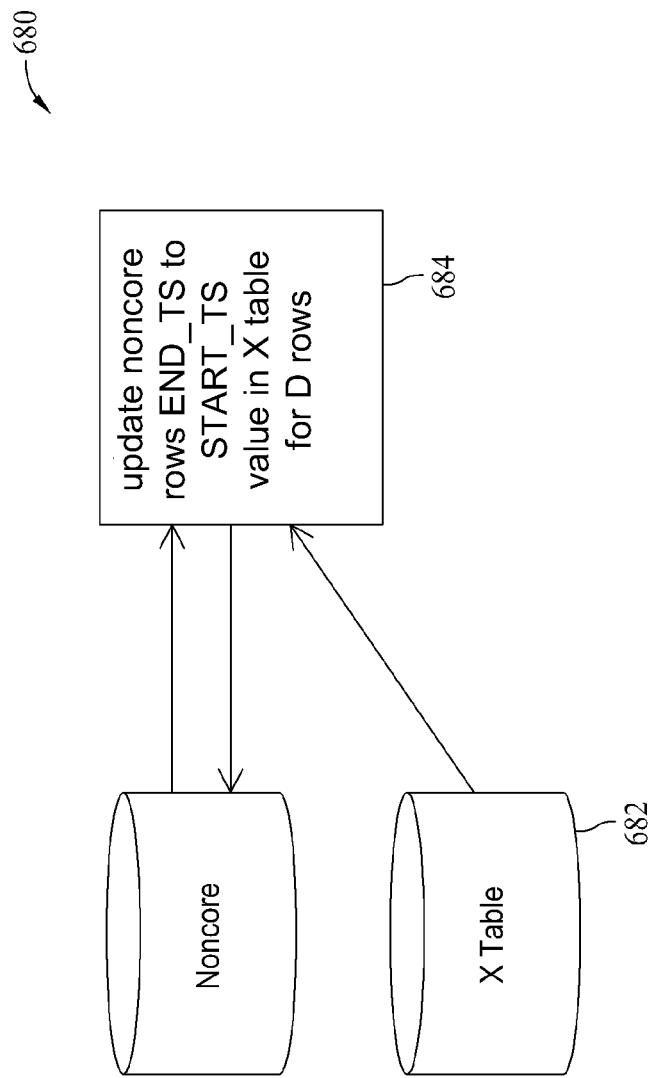
FIG. 23 is a data flow diagram associated with Apply Step 206 shown in FIG. 5.

FIG. 23 is a data flow diagram 680 illustrating Apply Step 206, which is the expiration of noncore rows due to logical deletion. For an ETL_Indicator of 'D', the source starting timestamp has been saved into the source ending timestamp in the X_table 682 to provide the full target primary key, and update 684 the ending timestamp to the delete timestamp value.

The following is an example of pseudo code that is associated with Apply Step 206.

| Step 206 - Pseudo Code |
| --- |
| UPDATE NC_Tbl<br>FROM noncore NC_Tbl, x table X_Tbl<br>Set NC_Tbl source end ts = X tbl source start ts,<br>    NC_Tbl.cdw end ts = current timestamp for table<br>Where NC_Tbl.PK_latest = X_Tbl.PK_latest<br>    And NC_Tbl.source_start_ts = X_Tbl.src_end ts -- ensures 1-to-1<br>    And X_Table.ETL_Indicator is 'D'<br>    And NC_Tbl source end ts is null or greater than X table start ts |

The following is an example of pseudo code that is associated with Apply Step 207.

| Step 207 - Pseudo Code |
| --- |
| END TRANSACTION<br>Evaluate whether to refresh noncore statistics |

In exemplary embodiments, all change data capture (CDC) processes (the above described steps and apply steps) are completed before that portion of any subsequent mini-batch data load begins that writes to the W_table and/or X_table or invokes CDC for a given source system or set of target tables. As such, the entire load process is not serialized, only the writing to the W_table and/or X_table and the invocation of CDC.

The above described embodiments are utilized to load any volume of data from any source system without modification, with enough efficiency to support mini-batch schedules as often as 10 or 15 minutes into a continuously available temporal normalized data warehouse. These embodiments, with minor database-specific adjustments (e.g. name of catalog table listing columns), can be used on any relational database supporting the ANSI SQL-2003 standard (or a lower standard with some translation) to load a temporal normalized data warehouse that retains history and does not need to actively enforce referential integrity. Furthermore, use of the embodied metadata optimization parameters, particularly with respect to partitioning the workload, facilitates reducing the computing resource cost per load process sufficiently to permit the loading of data, at increased latency, on commodity computer servers using an Symmetric Multiprocessing (SMP) architecture, rather than the more expensive Massively Parallel Processing (MPP) architecture commonly used in data warehouses. The embodiments operate within a set of candidate rows and between those rows and the target database, allowing multiple rows within a primary key to be processed at once, sequenced and collapsed if a contiguous duplicate with respect to a time interval.

Therefore, in at least one embodiment, a method of populating a temporal normalized data warehouse is provided that includes analyzing a set of incoming data with respect to itself and an existing data warehouse, identifying and sequencing net change data using the relational algebra set of operators (set-SQL), and applying inserts and temporal updates to the data warehouse all while the data remains within the data warehouse itself. To accomplish the above described method, software code can be dynamically generated to perform data inserts and temporal updates, and the generated code is then executed. Additionally, contiguous data is compressed into the minimum number of time periods, and microsecond level sequences within unique timestamps are generated and maintained as needed.

In at least one embodiment, a system is provided that includes a data warehouse, a capability of receiving sets of incoming data to be stored into the data warehouse, and a sequencing unit operable to identify and sequence a net change in the data received against that previously stored in the data warehouse. The system may include one or more of a compression unit operable to compress contiguous data into the minimum time periods, an autocoder unit to generate code to perform data warehouse updates, and an execution unit to execute generated code. The sequencing unit is operable to utilize the relational algebra set of operators to identify and sequence data implemented in this instance using widely accepted ANSI-standard Structured Query Language (SQL) Data Manipulation Language (DML).

It is widely recognized that larger successful companies are moving to have a single or small number of normalized temporal data warehouses for most if not all analytic needs, replacing hundreds of operational data stores and data marts. This paradigm has created a substantial need for entirely new types of efficient and relatively non-intrusive load software. The described embodiments provide a dramatic reduction in development and sustaining costs for a temporal data warehouse, large cost avoidance in data load server use and network traffic as work is much efficiently processed in SQL in the database, and avoids any need for a second copy of the target database during loading periods strictly to support continuous query availability (a second copy may still be utilized for other reasons). The described embodiments are applicable to any database platform as temporal data warehouse use grows globally and no current technology provides similar capabilities while also uniquely enabling a data warehouse strategy of supporting multiple types of analytic needs (operational, tactical, strategic) from a single copy of continuously available data across the scope of the data warehouse, whether one or more subject areas or the entire enterprise.

The described systems and methods support near real-time, minimally intrusive loading of a single normalized data warehouse, which in turn enables continuous and near immediate external access, via appropriate security and authorization controls, to a single copy of all data in a single system with full temporal history normalized into the minimum time periods required.

In exemplary embodiments, partitioning of an incoming data set is optional. Partitions may be independently processed, such that executing processes do not access data from more than one partition. Rather, the results of processing each partition may be accumulated into an X_table for use in a single apply step (not parallelized or partitioned), as described further above.

Some embodiments employ volatile (e.g., non-persistent) tables in importing an incoming data set. A full set of volatile tables may be used, for example, when partitions are specified. Further, data may be normalized (e.g., temporally normalized) between the existing data in the computer data warehouse (CDW) and the incoming data set, whether using conventional, persistent ("physical") tables and no partitions or using partitions and volatile copies of the physical tables, one set per partition (e.g., four virtual tables per partition).

Figure 24:
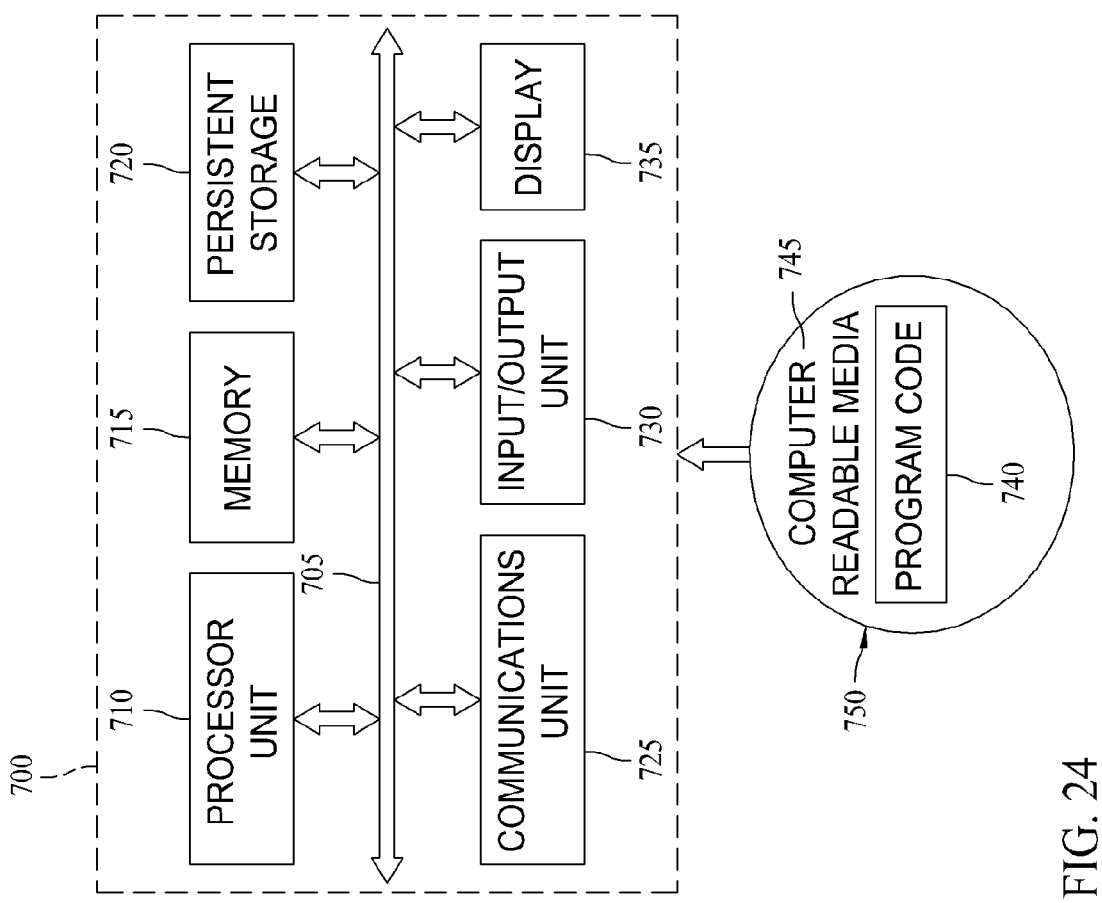
FIG. 24 is a block diagram of an exemplary computing device.

Embodiments of the invention may be performed using one or more computing devices, such as database server 16 and/or application server 24 (shown in FIG. 2). FIG. 24 is a block diagram of an exemplary computing device 700. In the exemplary embodiment, computing device 700 includes communications fabric 705 that provides communications between a processor unit 710, a memory 715, persistent storage 720, a communications unit 725, an input/output (I/O) unit 730, and a presentation interface, such as a display 735. In addition to, or in alternative to, the presentation interface may include an audio device (not shown) and/or any device capable of conveying information to a user.

Processor unit 710 executes instructions for software that may be loaded into memory 715. Processor unit 710 may be a set of one or more processors or may include multiple processor cores, depending on the particular implementation. Further, processor unit 710 may be implemented using one or more heterogeneous processor systems in which a main processor is present with secondary processors on a single chip. In another embodiment, processor unit 710 may be a homogeneous processor system containing multiple processors of the same type.

Memory 715 and persistent storage 720 are examples of storage devices. As used herein, a storage device is any piece of hardware that is capable of storing information either on a temporary basis and/or a permanent basis. Memory 715 may be, for example, without limitation, a random access memory and/or any other suitable volatile or non-volatile storage device. Persistent storage 720 may take various forms depending on the particular implementation, and persistent storage 720 may contain one or more components or devices. For example, persistent storage 720 may be a hard drive, a flash memory, a rewritable optical disk, a rewritable magnetic tape, and/or some combination of the above. The media used by persistent storage 720 also may be removable. For example, without limitation, a removable hard drive may be used for persistent storage 720.

A storage device, such as memory 715 and/or persistent storage 720, may be configured to store data for use with the processes described herein. For example, a storage device may store computer-executable instructions, executable software components (e.g., a data load component and/or a data warehouse component), data received from data sources, configuration data (e.g., optimization options), and/or any other information suitable for use with the methods described herein.

Communications unit 725, in these examples, provides for communications with other computing devices or systems. In the exemplary embodiment, communications unit 725 is a network interface card. Communications unit 725 may provide communications through the use of either or both physical and wireless communication links.

Input/output unit 730 enables input and output of data with other devices that may be connected to computing device 700. For example, without limitation, input/output unit 730 may provide a connection for user input through a user input device, such as a keyboard and/or a mouse. Further, input/output unit 730 may send output to a printer. Display 735 provides a mechanism to display information to a user. For example, a presentation interface such as display 735 may display a graphical user interface.

Instructions for the operating system and applications or programs are located on persistent storage 720. These instructions may be loaded into memory 715 for execution by processor unit 710. The processes of the different embodiments may be performed by processor unit 710 using computer implemented instructions and/or computer-executable instructions, which may be located in a memory, such as memory 715. These instructions are referred to herein as program code (e.g., object code and/or source code) that may be read and executed by a processor in processor unit 710. The program code in the different embodiments may be embodied on different physical or tangible computer readable media, such as memory 715 or persistent storage 720.

Program code 740 is located in a functional form on non-transitory computer readable media 745 that is selectively removable and may be loaded onto or transferred to computing device 700 for execution by processor unit 710. Program code 740 and computer readable media 745 form computer program product 750 in these examples. In one example, computer readable media 745 may be in a tangible form, such as, for example, an optical or magnetic disc that is inserted or placed into a drive or other device that is part of persistent storage 720 for transfer onto a storage device, such as a hard drive that is part of persistent storage 720. In a tangible form, computer readable media 745 also may take the form of a persistent storage, such as a hard drive, a thumb drive, or a flash memory that is connected to computing device 700. The tangible form of computer readable media 745 is also referred to as computer recordable storage media. In some instances, computer readable media 745 may not be removable.

Alternatively, program code 740 may be transferred to computing device 700 from computer readable media 745 through a communications link to communications unit 725 and/or through a connection to input/output unit 730. The communications link and/or the connection may be physical or wireless in the illustrative examples. The computer readable media also may take the form of non-tangible media, such as communications links or wireless transmissions containing the program code.

In some illustrative embodiments, program code 740 may be downloaded over a network to persistent storage 720 from another computing device or computer system for use within computing device 700. For instance, program code stored in a computer readable storage medium in a server computing device may be downloaded over a network from the server to computing device 700. The computing device providing program code 740 may be a server computer, a workstation, a client computer, or some other device capable of storing and transmitting program code 740.

Program code 740 may be organized into computer-executable components that are functionally related. Each component may include computer-executable instructions that, when executed by processor unit 710, cause processor unit 710 to perform one or more of the operations described herein.

The different components illustrated herein for computing device 700 are not meant to provide architectural limitations to the manner in which different embodiments may be implemented. The different illustrative embodiments may be implemented in a computer system including components in addition to or in place of those illustrated for computing device 700. For example, other components shown in FIG. 24 can be varied from the illustrative examples shown.

As one example, a storage device in computing device 700 is any hardware apparatus that may store data. Memory 715, persistent storage 720 and computer readable media 745 are examples of storage devices in a tangible form.

In another example, a bus system may be used to implement communications fabric 705 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 715 or a cache such as that found in an interface and memory controller hub that may be present in communications fabric 705.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system configured to load an incoming data set into a temporal data warehouse, said system comprising:
   a storage device including a temporal data warehouse and an incoming data set; and
   a processor unit coupled to said storage device and programmed to:
      determine that the incoming data set includes a snapshot of data from a source database;
      determine an earliest source timestamp associated with a first data record in the incoming data set;
      identify a set of primary keys that represent:
         a data record in the temporal data warehouse associated with a source timestamp immediately prior to the earliest source timestamp; and
         one or more data records in the temporal data warehouse that are associated with a source timestamp later than the earliest source timestamp;
      divide the incoming data set into a plurality of partitions including a first partition and a second partition, wherein each partition of the plurality of partitions includes a plurality of data records;
      import the first partition into a pre-load table based on the identified set of primary keys;
      import the second partition into the pre-load table based on the identified set of primary keys;
      apply the pre-load table to the temporal data warehouse;
      detect that an active data record in the temporal data warehouse is not associated with one of the plurality of data records in the incoming data set; and
      execute an implicit delete of the active data record based on the determination that the incoming data set includes the snapshot of data from the source data base and the detection.

2. The system in accordance with claim 1, wherein said processor unit is programmed to divide the incoming data set into the plurality of partitions at least in part by applying a hash function to a primary key associated with at least one data record to produce a hash value corresponding to the at least one data record, wherein the primary key is included in the plurality of primary keys.

3. The system in accordance with claim 1, wherein said processor unit is further programmed to import the second partition into the pre-load table after the first partition is pre-loaded into the table.

4. The system in accordance with claim 1, wherein said processor unit is further programmed to import the second partition into the pre-load table while the first partition is being imported into the pre-load table.

5. The system in accordance with claim 4, wherein said processor unit is programmed to import the second partition into the pre-load table while the first partition is being imported into the pre-load table based on determining that a current quantity of parallel imports is less than a predetermined maximum quantity of parallel imports.

6. The system in accordance with claim 1, wherein said processor unit is programmed to import at least one of the first partition and the second partition at least in part by:
   importing data records of the at least one of the first partition and the second partition into a volatile table corresponding to the at least one of the first partition and the second partition; and
   copying the data records from the volatile table to the pre-load table.

7. The system in accordance with claim 1, wherein said processor is further programmed to:
   identify data records in the first partition that include a plurality of fields other than a timestamp that are equal to non-key fields of a previously imported data record; and exclude the identified data records when importing the first partition into the pre-load table.

8. A method for loading a plurality of data records into a temporal data warehouse, said method comprising:
determining that the data records include a snapshot of data from a source database;
determining an earliest source timestamp associated with a first data record in the data records;
identifying a set of primary keys that represent:
a data record in the temporal data warehouse associated with a source timestamp immediately prior to the earliest source timestamp; and
one or more data records in the temporal data warehouse that are associated with a source timestamp later than the earliest source timestamp;
dividing the data records into a plurality of partitions including a first partition and a second partition;
importing, by a computing device, the first partition into a pre-load table based on the identified set of primary keys;
importing, by the computing device, the second partition into the pre-load table based on the identified set of primary keys;
applying the pre-load table to the temporal data warehouse;
detecting, by the computing device, that an active data record in the temporal data warehouse is not associated with one of the plurality of data records; and
executing, by the computing device, an implicit delete of the active data record based on said determining that the data records include the snapshot of data from the source data base and said detecting.

9. The method in accordance with claim 8, wherein the first partition and the second partition are imported in parallel.

10. The method in accordance with claim 8, further comprising determining that a current quantity of parallel imports is less than a predetermined maximum quantity of parallel imports, wherein the first partition and the second partition are imported in parallel based on said determining.

11. The method in accordance with claim 8, further comprising determining that a current quantity of parallel imports is greater than or equal to a predetermined maximum quantity of parallel imports, wherein the first partition and the second partition are imported sequentially based on said determining.

12. The method in accordance with claim 8, wherein dividing, by a computing device, the data into the plurality of partitions comprises:
applying a hash function to at least one data record to create a hash value associated with the at least one data record; and
applying a modulus operator to the hash value based on a predetermined quantity of partitions to determine a partition number corresponding to and associated with the at least one data record.

13. The method in accordance with claim 8, further comprising:
identifying the data records in the first partition that include a plurality of fields other than a timestamp that are equal to non-key fields of a previously imported data record; and
excluding the identified data records when importing the first partition into the pre-load table.

14. A computer program product comprising a non-transitory computer readable medium having embodied thereon computer-executable instructions configured to load a data warehouse with net change data, wherein when executed by at least one processor, the computer-executable instructions cause the processor to:
determine that an incoming data set includes a snapshot of data from a source database;
determine an earliest source timestamp associated with a first data record in the incoming data set;
identify a set of primary keys that represent:
a data record in the temporal data warehouse associated with a source timestamp immediately prior to the earliest source timestamp; and
one or more data records in the temporal data warehouse that are associated with a source timestamp later than the earliest source timestamp;
divide an incoming data set into a plurality of partitions including a first partition and a second partition, wherein at least one partition of the plurality of partitions includes a plurality of data records;
import the first partition into a pre-load table based on the identified set of primary keys;
import the second partition into the pre-load table based on the identified set of primary keys;
apply the pre-load table to the data warehouse;
detect that an active data record in the data warehouse is not associated with a data record in the incoming data set; and
execute an implicit delete of the active data record responsive to the determination that the incoming data set includes the snapshot of data from the source data base and the detection.

15. The computer program product in accordance with claim 14, wherein the computer-executable instructions further cause the at least one processor to import the first partition and the second partition in parallel to each other.

16. The computer program product in accordance with claim 14, wherein the computer-executable instructions further cause the at least one processor to:
compare a current quantity of parallel imports to a predetermined maximum quantity of parallel imports;
when the current quantity is less than the maximum quantity of parallel imports, import the second partition in parallel with importing the first partition; and
when the current quantity is greater than or equal to the maximum quantity of parallel imports, import the second partition after import of the first partition.

17. The computer program product in accordance with claim 14, wherein the computer-executable instructions cause the at least one processor to import the first partition and the second partition at least in part by:
importing the data records of the first partition into a first volatile table with correspondence to the first partition;
importing the data records of the second partition into a second volatile table with correspondence to the second partition; and
copying the data records of the first volatile table and the second volatile table to the pre-load table.

18. The computer program product in accordance with claim 14, wherein the computer-executable instructions further cause the at least one processor to:
determine that the incoming data includes a snapshot of data from a source database and wherein the computer-executable instructions cause the at least one processor to execute an implicit delete of the active data record responsive to the detection at least in part by executing an implicit delete of the active data record responsive to the detection and to the determination.

* * * * *